US005283768A

United States Patent [19]

Rorden

[11] Patent Number: 5,283,768

[45] Date of Patent: Feb. 1, 1994

[54] BOREHOLE LIQUID ACOUSTIC WAVE TRANSDUCER

[75] Inventor: Louis H. Rorden, Los Altos, Calif.

[73] Assignee: Baker Hughes Incorporated, Houston, Tex.

[21] Appl. No.: 715,364

[22] Filed: Jun. 14, 1991

[51] Int. Cl.$^5$ .............................................. G01V 1/40

[52] U.S. Cl. ...................................... 367/83; 367/912; 340/854.3; 340/856.4

[58] Field of Search ................. 367/83, 174, 175, 150, 367/912; 340/853.3, 854.3, 856.4

[56] References Cited

U.S. PATENT DOCUMENTS

| | | | |
|---|---|---|---|
| 2,354,887 | 8/1944 | Silverman et al. | 177/352 |
| 2,388,141 | 10/1945 | Harrington | 255/1 |
| 2,411,696 | 11/1946 | Silverman et al. | 177/352 |
| 3,150,346 | 9/1964 | Polly et al. | 340/8 |
| 3,233,674 | 2/1966 | Leutwyler | 166/63 |
| 3,305,825 | 2/1967 | Godbey | 340/18 |
| 3,390,220 | 12/1975 | Shawhan | 340/18 |
| 3,496,533 | 2/1970 | Semmelink | 340/17 |
| 3,665,955 | 5/1972 | Conner, Sr. | 137/495 |
| 3,668,029 | 8/1972 | Bartoe, Jr. et al. | 178/6.8 |
| 3,737,845 | 6/1973 | Maroney et al. | 340/18 P |
| 3,750,096 | 7/1973 | Koomey et al. | 340/5 R |
| 3,790,930 | 2/1974 | Lamel et al. | 340/18 |
| 3,800,277 | 5/1974 | Patton et al. | 73/152 |
| 3,949,354 | 4/1976 | Claycomb | 340/18 |
| 3,958,217 | 5/1976 | Spinnier | 340/18 |
| 3,961,308 | 6/1976 | Parker | 340/18 |
| 3,964,556 | 6/1976 | Gearhart et al. | 175/45 |
| 4,038,632 | 7/1977 | Parker | 340/18 |
| 4,057,781 | 11/1977 | Scherbatskoy | 340/18 |
| 4,073,341 | 2/1978 | Parker | 166/65 |
| 4,129,184 | 12/1978 | Parker | 166/315 |
| 4,147,222 | 3/1979 | Patten et al. | 175/9 |
| 4,181,014 | 1/1980 | Zuvela et al. | 73/151 |
| 4,215,425 | 7/1980 | Waggener | 367/83 |
| 4,215,426 | 7/1980 | Klett | 367/83 |
| 4,254,481 | 3/1981 | Smither et al. | 367/82 |
| 4,293,936 | 10/1981 | Cox et al. | 367/82 |
| 4,293,937 | 10/1981 | Sharp et al. | 367/82 |
| 4,298,970 | 11/1981 | Shawhan et al. | 367/82 |
| 4,314,365 | 2/1982 | Petersen et al. | 367/82 |
| 4,320,473 | 3/1982 | Smither et al. | 367/82 |
| 4,373,582 | 2/1983 | Bednar et al. | 166/65 |
| 4,562,559 | 12/1985 | Sharp et al. | 367/82 |
| 4,578,675 | 3/1986 | MacLeod | 340/855 |
| 4,669,068 | 5/1987 | Klett | 367/83 |
| 4,689,775 | 8/1987 | Scherbatskoy | 367/83 |
| 4,787,093 | 11/1988 | Rorden | 375/23 |
| 5,065,825 | 11/1991 | Bardin et al. | 175/38 |
| 5,067,114 | 11/1991 | Rorden | 367/81 |
| 5,113,379 | 5/1992 | Scherbatskoy | 367/83 |
| 5,197,041 | 3/1993 | Balogh | 367/83 |

FOREIGN PATENT DOCUMENTS

| | | | |
|---|---|---|---|
| 0377378 | 11/1990 | European Pat. Off. | E21B 41/00;7/06;47/12 |
| 1540479 | 2/1979 | United Kingdom | G01R 15/00 |
| 2015307 | 9/1979 | United Kingdom . | |
| 1592995 | 7/1981 | United Kingdom | G08C 23/00 |
| 2123458 | 2/1984 | United Kingdom . | |
| 2142453A | 1/1985 | United Kingdom | G08C 23/00 |

*Primary Examiner*—Ian J. Lobo

*Attorney, Agent, or Firm*—Melvin A. Hunn

[57] ABSTRACT

A transducer is described especially designed for use in providing acoustic transmission in a borehole. The transducer includes a multiple number of magnetic circuit gaps and electrical windings that have been found to provide the power necessary for acoustic operation in a borehole while still meeting the stringent dimensional criteria necessitated by boreholes. Various embodiments conforming to the design are described. Moreover, the invention includes transition and reflector sections, as well as a directional coupler and resonator arrangement particularly adapted for borehole acoustic communication.

56 Claims, 8 Drawing Sheets

BOREHOLE LIQUID ACOUSTIC WAVE TRANSDUCER

BACKGROUND OF THE INVENTION

The present invention relates to communication through a borehole, such as between a surface and a downhole location in such a borehole, by transmitting acoustic waves lengthwise in such a borehole with liquid therein being the transmission medium. It more specifically relates to a transducer for converting between electrical power and acoustical power in such a borehole liquid, which transducer is not dependent upon movement of the liquid in order to provide communication.

One of the more difficult problems associated with any borehole is to communicate intelligence between one or more locations down a borehole and the surface, or 18 between downhole locations themselves. For example, communication is desired by the oil industry to retrieve, at the surface, data generated downhole during drilling operations, including during quiescent periods interspersing actual drilling procedures or while tripping; during completion operations such as perforating, fracturing, and drill stem or well testing; and during production operations such as reservoir evaluation testing, pressure and temperature monitoring. Communication is also desired in such industry to transmit intelligence from a surface to downhole tools or instruments to effect, control or modify operations or parameters.

Accurate and reliable downhole communication is particularly important when data (intelligence) is to be communicated, i.e., when more than a simple trigger signal or the like has to be communicated. This intelligence often is in the form of an encoded digital signal.

One approach which has been widely considered for borehole communication is to use a direct wire connection between the surface and the downhole location(s). Communication then can be via electrical signal through the wire. While much effort has been expended toward "wireline" communication, this approach has not been adopted commercially because it has been found to be quite costly and unreliable. For example, one difficulty with this approach is that since the wire is often laid via numerous lengths of a drill stem or production tubing, it is not unusual for there to be a break or poor wire connection formed at the time the wire assembly is first installed. While it has been proposed (see U.S. Pat. No. 4,215,426) to avoid the problems associated with direct electrical coupling of drill stems by providing inductive coupling for the communication link at such location, inductive coupling has as a problem, among others, major signal loss at every coupling. It also relies on installation of special and complex drill string arrangements.

Another borehole communication technique that has been explored is the transmission of acoustic waves. Such physical waves need a transmission medium that will propagate the same. It will be recognized that matters such as variations in earth strata, density make-up, etc., render the earth completely inappropriate for an acoustic communication transmission medium. Because of these known problems, those in the art generally have confined themselves to exploring acoustic communication through borehole related media.

Much effort has been expended toward developing an appropriate acoustic communication system in which the borehole drill stem or production tubing itself, acts as the transmission medium. A major problem associated with such arrangements is caused by the fact that the configurations of drill stems or production tubing generally vary significantly lengthwise. These variations typically are different in each hole. Moreover, a configuration in a particular hole may vary over time because, for example, of the addition of tubing, etc. The result is that there is no general usage system relying on drill stem or production tubing transmission that has gained meaningful market acceptance.

Efforts have also been made to utilize liquid within a borehole as the acoustic transmission medium. At first blush, one would think that use of a liquid as the transmission medium in a borehole would be a relatively simple approach, in view of the wide usage and significant developments that have been made for communication and sonar systems relying on acoustic transmission within the ocean. In fact, U.S. Pat. No. 3,233,674 is an example of a patent which simply mentions such communication without taking into consideration the fact that those skilled in the art may not be able to implement the same.

Acoustic transmission of a liquid within a borehole is considerably different than acoustic transmission within an open ocean because of the problems associated with the boundaries between the liquid and its confining structures in a borehole. Criteria relating to these problems are of paramount importance. However, because of the attractiveness of the concept of acoustic transmission in a liquid independent of movement thereof, a system was proposed in U.S. Pat. No. 3,964,556 utilizing pressure changes in a non-moving liquid to communicate. Such system has not been found practical, however, since it is not a self-contained system and some movement of the liquid has been found necessary to transmit pressure changes.

In light of the above, meaningful communication of intelligence via borehole liquids has been limited to systems which rely flow of the liquid to carry on acoustic modulation from a transmission point to a receiver. This approach is generally referred to in the art as MWD (measure while drilling). Developments relating to it have been limited to communication during the drilling phase in the life of a borehole, principally since it is only during drilling that one can be assured of fluid which can be modulated flowing between the drilling location and the surface. Most MWD systems are also constrained because of the drilling operation itself. For example, it is not unusual that the drilling operation must be stopped during communication to avoid the noise associated with such drilling. Moreover, communication during tripping is impossible.

In spite of the problems with MWD communication, much research has been done on the same in view of the desirability of good borehole communication. The result has been an extensive number of patents relating to MWD, many of which are directed to proposed solutions to the various problems that have been encountered. U.S. Pat. No. 4,215,426 describes an arrangement in which power (rather than communication) is transmitted downhole through fluid modulation akin to MWD communication, a portion of which power is drained off at various locations downhole to power repeaters in a wireline communication transmission system.

The development of communication using acoustic waves propagating through non-flowing fluids in a borehole has been impeded by lack of a suitable transducer. To be practical for a borehole application, such a transducer has to fit in a pressure barrel with an outer diameter of no more than 1.25 inches, operate at temperatures up to 150° C. and pressures up to 1000 bar, and survive the working environment of handling and running in a well. Such a transducer would also have to take into consideration the significant differences between communication in a non-constrained fluid environment, such as in the ocean, and a confined fluid arrangement, such as in a borehole.

SUMMARY OF THE INVENTION

The present invention relates to a practical borehole acoustic communication transducer. It is capable of generating, or responding to, acoustic waves in a viscous liquid confined in a borehole. Its design takes into consideration the waveguide nature of a borehole. In this connection, it has been found that to be practical a borehole acoustic transducer has to generate, or respond to, acoustic waves at frequencies below 1 kHz with bandwidths of 10's of Hz, efficiently in various liquids. It has to be able to do so while providing high displacement and having a lower mechanical impedance than conventional open ocean devices. The transducer of the invention meets these criteria as well as the size and operating criteria mentioned above.

The transducer of the invention has many features that contribute to its capability. It is similar to a moving coil loudspeaker in that movement of an electric winding relative to magnetic flux in the gap of a magnetic circuit is used to convert between electric power and mechanical motion. It uses the same interaction for transmitting and receiving. A dominant feature of the transducer of the invention is that a plurality of gaps are used with a corresponding number (and placement) of electrical windings. This facilitates developing with such a small diameter arrangement, the forces and displacements found to be necessary to transduce the low frequency waves required for adequate transmission through non-flowing viscous fluid confined in a borehole. Moreover, a resonator may be included as part of the transducer if desired to provide a compliant backload.

As another major feature, the invention includes several arrangements responsible for assuring that there is good borehole transmission of acoustic waves. For one, a transition section is included in the borehole communication channel to provide acoustic impedance matching between sections having significantly different cross-sectional areas such as between the section of the borehole having the transducer and any adjacent borehole section. In this connection, reference throughout this patent specification to a "cross-sectional" area is reference to the cross-sectional area of the transmission (communication) channel. For another, a directional coupler arrangement is described which is at least partially responsible for inhibiting transmission opposite to the direction in the borehole of the desired communication. Specifically, a reflection section is defined in the borehole communication channel, which section is spaced generally an odd number of quarter wavelengths from the transducer and positioned in a direction opposite that desired for the communication, to reflect back in the proper communication direction, any acoustic waves received by the same which are being propagated in the wrong direction. Most desirably, a multiple number of reflection sections meeting this criteria are provided as will be described in detail.

A special directional coupler based on back-loading of the transducer piston also can be provided for this purpose. Most desirably, the borehole acoustic communication transducer of the invention has a chamber defining a compliant back-load for the piston, through which a window extends that is spaced from the location in the communication channel at which the remainder of the transducer interacts with borehole liquid by generally an odd number of quarter wavelengths of the nominal frequency of the central wavelength of potential communication waves at the locations of said window and the point o interaction.

Other features and advantages of the invention will be disclosed or will become apparent from the following more detailed description. While such description includes many variations which occurred to Applicant, it will be recognized that the coverage afforded Applicant is not limited to such variations. In other words, the presentation is supposed to be exemplary, rather than exhaustive.

BRIEF DESCRIPTION OF THE DRAWINGS

With reference to the accompanying drawings.

DETAILED DESCRIPTION OF THE PREFERRED EMBODIMENTS

Figures 1, 2:
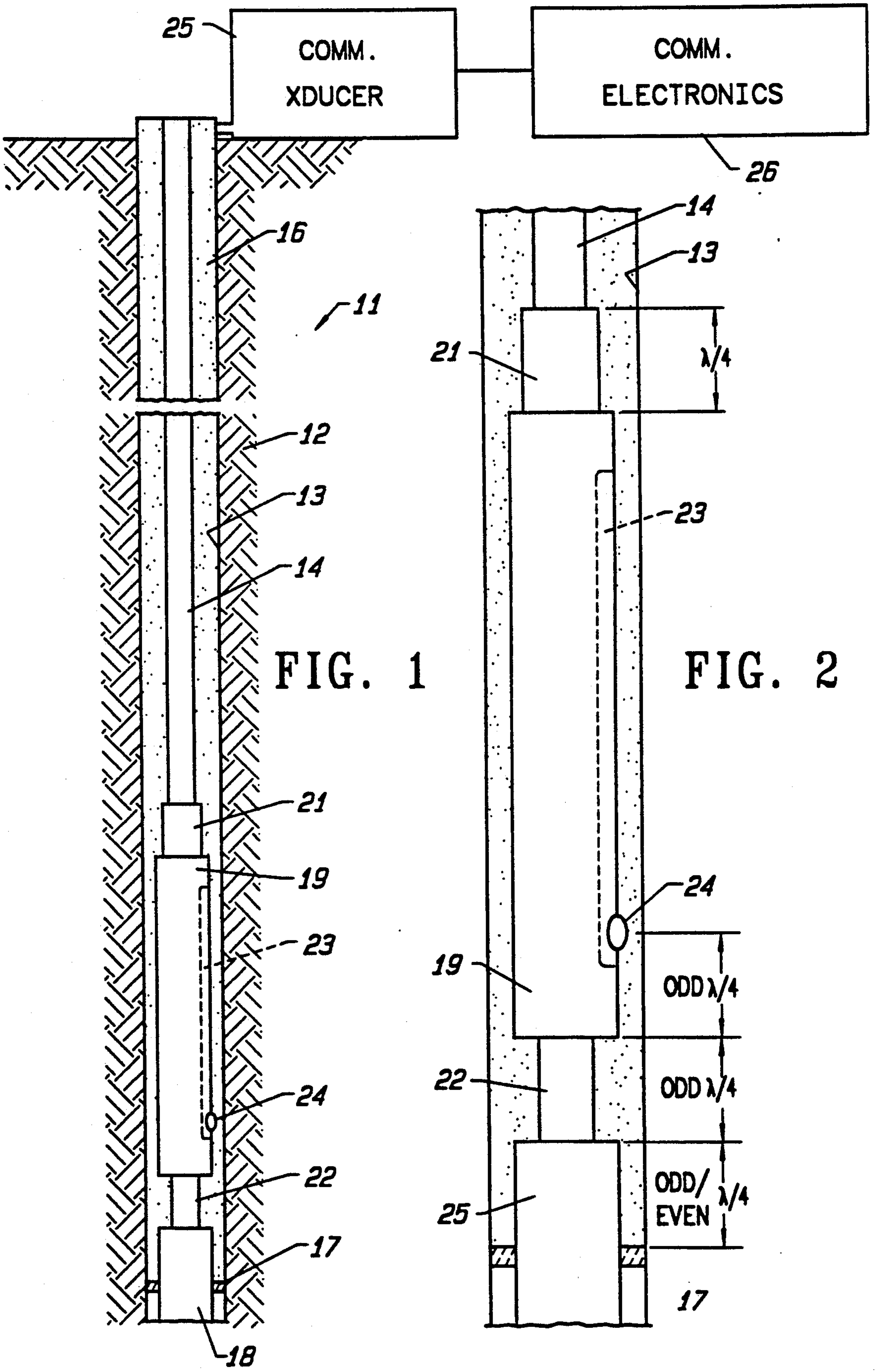
FIG. 1 is an overall schematic sectional view illustrating a potential location within a borehole of an implementation of the invention.
FIG. 2 is an enlarged schematic view of a portion of the arrangement shown in FIG. 1.
Figure 3:
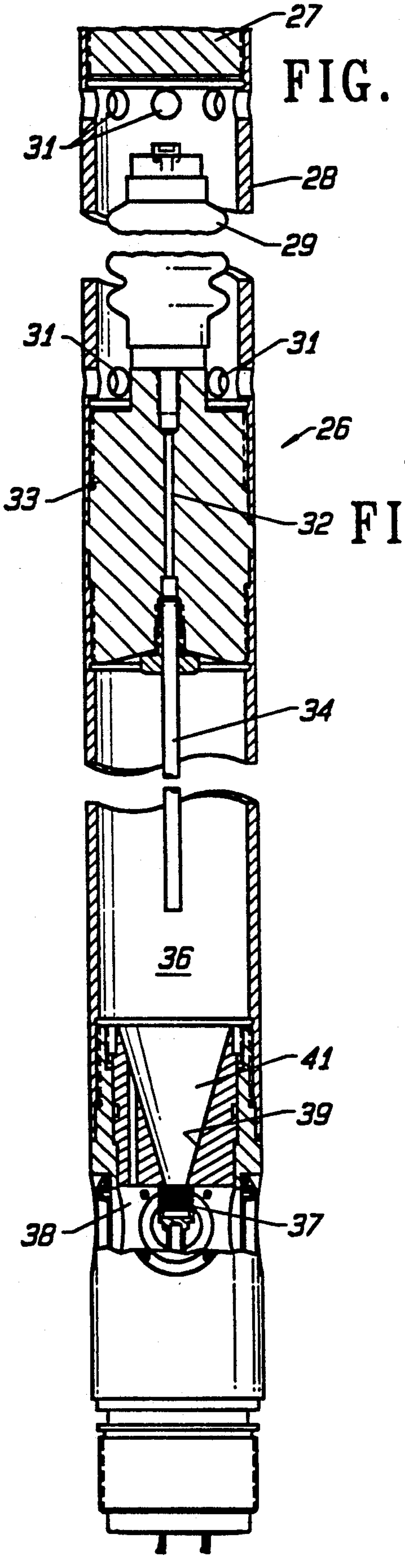
FIG. 3 is an overall sectional view of an implementation of the transducer of the instant invention.
Figure 5:
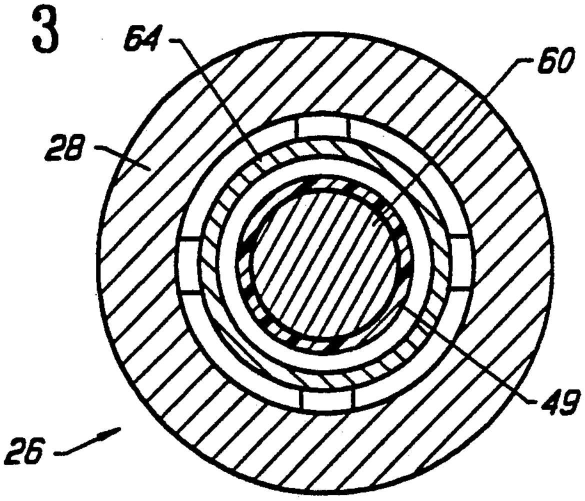
FIG. 5 is a transverse sectional view, taken on a plane indicated by the lines 5—5 in FIG. 4.
Figure 4:
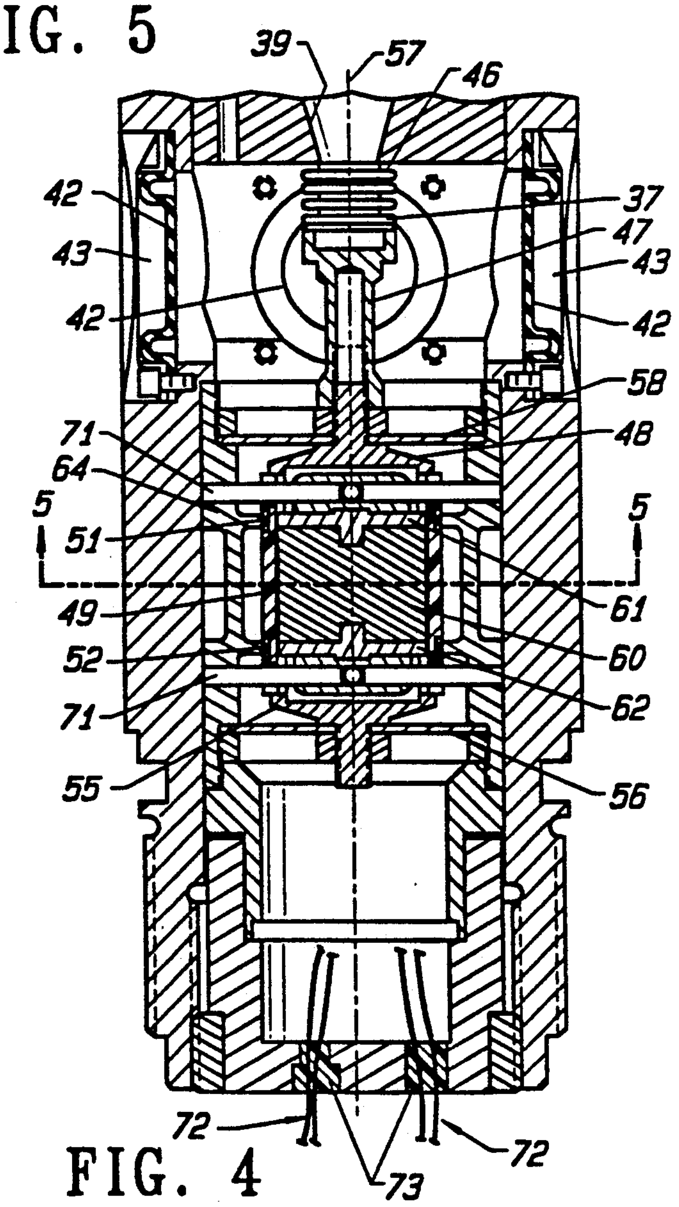
FIG. 4 is an enlarged sectional view of a portion of the construction shown in FIG. 3.

With reference to FIG. 1, a borehole, generally referred to by the reference numeral 11, is illustrated extending through the earth 12. Borehole 11 is shown as a petroleum product completion hole for illustrative purposes. In this connection, it includes a casing schematically illustrated at 13 and production tubing 14 within which the desired oil or other petroleum product flows. The annular space between the casing and production tubing is filled with a completion liquid represented by dots 16. This space is the communication channel of the invention. The viscosity of the completion liquid could be any viscosity within a wide range of possible viscosities. Its density also could be of any value within a wide range, and it may include corrosive liquid components like a high density salt such as a sodium, potassium and/or bromide compound.

In accordance with conventional practice, a packer represented at 17 is provided to seal the borehole and the completion fluid from the desired petroleum product. The production tubing 14 extends through the same as illustrated and may include a safety valve, data gathering instrumentation, etc., on the petroleum side of the packer 17.

A carrier 19 for the transducer of the invention is provided on the lower end of the tubing 14. As illustrated, a transition section 21 and one or more reflecting sections 22, which sections will be discussed in more detail below, separate the carrier from the remainder of the production tubing. Such carrier includes a slot 23 within which the communication transducer of the invention is held in a conventional manner, such as by strapping or the like. A data gathering instrument, a battery pack, etc., also could be housed within slot 23.

It is the completion liquid 16 which acts as the transmission medium for acoustic waves provided by the transducer. Communication between the transducer and the annular space which confines such liquid is represented in FIGS. 1 and 2 by port 24. Data can be transmitted through the port 24 to the completion liquid and, hence, by the same in accordance with the invention. For example, a predetermined frequency band may be used for signaling by conventional coding and modulation techniques, binary data may be encoded into blocks, some error checking added, and the blocks transmitted serially by Frequency Shift Keying (FSK) or Phase Shift Keying (PSK) modulation. The receiver then will demodulate and check each block for errors.

The annular communication channel space at the carrier 19 is significantly smaller in cross-sectional area than that of the greater part of the well containing, for the most part, only production tubing 14. This results in a corresponding mismatch of acoustic characteristic admittances. The purpose of transition section 21 is to minimize the reflections caused by the mismatch between the section having the transducer and the adjacent section. It is nominally one-quarter wavelength long at the desired center frequency and the sound speed in the fluid, and it is selected to have a diameter so that the annular area between it and the casing 13 is a geometric average of the product of the adjacent annular areas, i.e., the annular areas of the communication channel defined by the production tubing 14 and the carrier 19. Further transition sections can be provided as necessary in the borehole to alleviate mismatches of acoustic admittances along the communication path.

Reflections from the packer (or the well bottom in other designs) are minimized by the presence of a multiple number of reflection sections or steps in the communication channel below the carrier, the first of which is indicated by reference numeral 22. It provides a transition to the maximum possible annular area one-quarter wavelength below the transducer communication port. It is followed by a quarter wavelength long tubular section 25 providing an annular area for liquid with the minimum cross-sectional area it otherwise would face. Each of the reflection sections or steps can be a multiple number of quarter wavelengths long. The sections 19 and 21 should be an odd number of quarter wavelengths, whereas the section 25 should be odd or even (including zero), depending on whether or not the last step before the packer 17 has a large or small cross-section. It should be an even number (or zero) if the last step before the packer is from a large cross-section to a small cross-section.

While the first reflection step or section as described herein is the most effective, each additional one that can be added improves the degree and bandwidth of isolation. (Both the transition section 21, the reflection section 22 and the tubular section can be considered as parts of the combination making up the preferred transducer of the invention.)

A communication transducer for receiving the data is also provided at the location at which it is desired to have such data. In most arrangements this will be at the surface of the well, and the electronics for operation of the receiver and analysis of the communicated data also are at the surface or in some cases at another location. The receiving transducer most desirably is a duplicate in principle of the transducer being described. It is represented in FIG. 1 by box 25 at the surface of the well. The communication and analysis electronics is represented by box 26.

It will be recognized by those skilled in the art that the acoustic transducer arrangement of the invention is not limited necessarily to communication from downhole to the surface, e.g., transducers can be located for communication between two different downhole locations. It is also important to note that the principle on which the transducer of the invention is based lends itself to two-way design, i.e., a single transducer can be designed to both convert an electrical communication signal to acoustic communication waves, and vice versa.

An implementation of the transducer of the invention is generally referred to by the reference numeral 26 in FIGS. 3 through 6. This specific design terminates at one end in a coupling or end plug 27 which is threaded into a bladder housing 28. A bladder 29 for pressure expansion is provided in such housing. The housing 28 includes ports 31 for free flow into the same of the borehole completion liquid for interaction with the bladder. Such bladder communicates via a tube with a bore 32 extending through a coupler 33. The bore 32 terminates in another tube 34 which extends into a resonator 36. The length of the resonator is nominally $\lambda/4$ in the liquid within resonator 36. The resonator is filled with a liquid which meets the criteria of having low density, viscosity, sound speed, water content, vapor pressure and thermal expansion coefficient. Since some of these requirements are mutually contradictory, a compromise must be made, based on the condition of the application and design constraints. The best choices have thus far been found among the 200 and 500 series Dow Corning silicone oils, refrigeration oils such as Capella B, and lightweight hydrocarbons such as kerosene. The purpose of the bladder construction is to enable expansion of such liquid as necessary in view of the pressure, temperature, etc., of the borehole liquid at the downhole location of the transducer.

The transducer of the invention generates (or detects) acoustic wave energy in the communication channel by means of the interaction of a piston in the transducer housing with the borehole liquid. In this implementation, this is done by movement of a piston 37 in chamber 38 filled with the same liquid which fills resonator 36. Thus, the interaction of piston 37 with the borehole liquid is indirect, i.e., the piston is not in direct contact with such borehole liquid. Acoustic waves are generated in the communication channel by expansion and contraction of a bellows type piston 37 in housing chamber 38. In this connection, one end of the bellows of the piston arrangement is permanently fastened around a small opening 39 of a horn structure 41 so that reciprocation of the other end of the bellows will result in the desired expansion and contraction of the same. Such expansion and contraction causes corresponding flexures of isolating diaphragms 42 in windows 43 to impart acoustic energy waves to the borehole liquid on the other side of such diaphragms. Resonator 36 provides a compliant back-load for this piston movement. It should be noted that the same liquid which fills the chamber of the resonator 36 and chamber 38 fills the various cavities, etc., of the piston driver to be discussed hereinafter, and the change in volumetric shape of the chamber 38 caused by reciprocation of the piston takes place before pressure equalization can occur.

One way of looking at the resonator is that its chamber 36 acts, in effect, as a tuning pipe for returning in phase to piston 37, that acoustical energy which is not transmitted by the piston to the liquid in chamber 38 when such piston first moves. To this end, piston 37, made up of a steel bellows 46 (FIG. 4), is open at the end surrounding horn opening 39. The other end of the bellows is closed and has a driving shaft 47 secured thereto. The horn structure 41 communicates the resonator 36 with the piston, and such resonator aids in assuring that any acoustic energy generated by the piston that does not directly result in movement of isolating diaphragms 42 will reinforce the oscillatory motion of the piston. In essence, it intercepts that acoustic wave energy developed by the piston which does not directly result in radiation of acoustic waves and uses the same to enhance such radiation. It also acts to provide a compliant back-load for the piston 37 as stated previously. It should be noted that the inner wall of the resonator could be tapered or otherwise contoured to modify the frequency response.

The driver for the piston will now be described. It includes the driving shaft 47 secured to the closed end of the bellows. Such shaft also is connected to an end cap 48 for a tubular bobbin 49 which carries two annular coils or windings 51 and 52 in corresponding, separate radial gaps 53 and 54 (FIG. 6) of a closed loop magnetic circuit to be described. Such bobbin terminates at its other end in a second end cap 55 which is supported in position by a flat spring 56. Spring 56 centers the end of the bobbin to which it is secured and constrains the same to limited movement in the direction of the longitudinal axis of the transducer, represented in FIG. 4 by the line 57. A similar flat spring 58 is provided for the end cap 48.

In keeping with the invention, a magnetic circuit having a plurality of gaps is defined within the housing. To this end, a cylindrical permanent magnet 60 is provided as part of the driver coaxial with the axis 57. Such permanent magnet generates the magnetic flux needed for the magnetic circuit and terminates at each of its ends in a pole piece 61 and 62, respectively, to concentrate the magnetic flux for flow through the pair of longitudinally spaced apart gaps 53 and 54 in the magnetic circuit. The magnetic circuit is completed by an annular magnetically passive member of magnetically permeable material 64. As illustrated, such member includes a pair of inwardly directed annular flanges 66 and 67 which terminate adjacent the windings 51 and 52 and define one side of the gaps 53 and 54.

Figure 6:
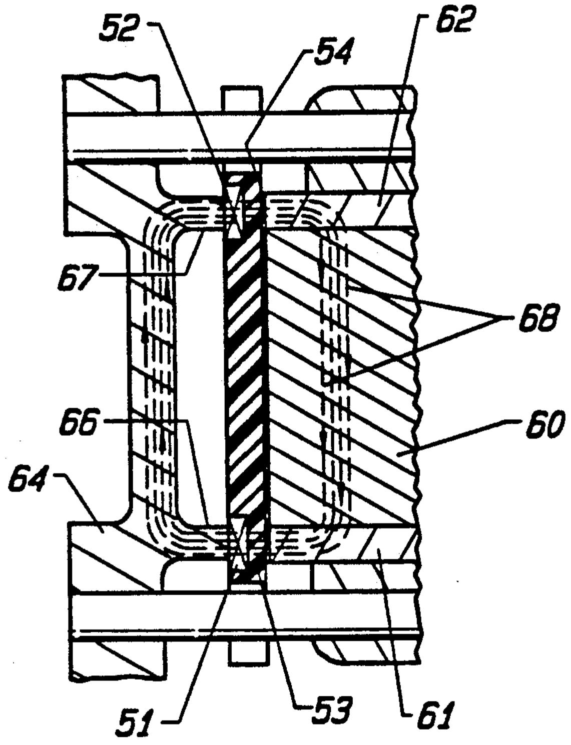
FIG. 6 is a partial, somewhat schematic sectional view showing the magnetic circuit provided by the implementation illustrated in FIGS. 3-5.

The magnetic circuit formed by this implementation is represented in FIG. 6 by closed loop magnetic flux lines 68. As illustrated, such lines extend from the magnet 60, through pole piece 61, across gap 53 and coil 51, through the return path provided by member 64, through gap 54 and coil 52, and through pole piece 62 to magnet 60. With this arrangement, it will be seen that magnetic flux passes radially outward through gap 53 and radially inward through gap 54. Coils 51 and 52 are connected in series opposition, so that current in the same provides additive force on the common bobbin. Thus, if the transducer is being used to transmit a communication, an electrical signal defining the same passed through the coils 51 and 52 will cause corresponding movement of the bobbin 49 and, hence, the piston 37. Such piston will interact through the windows 43 with the borehole liquid and impart the communicating acoustic energy thereto. Thus, the electrical power represented by the electrical signal is converted by the transducer to mechanical power, i.e., acoustic waves.

When the transducer receives a communication, the acoustic energy defining the same will flex the diaphragms 42 and correspondingly move the piston 37. Movement of the bobbin and windings within the gaps 62 and 63 will generate a corresponding electrical signal in the coils 51 and 52 in view of the lines of magnetic flux which are cut by the same. In other words, the acoustic power is converted to electrical power.

In the implementation being described, it will be recognized that the permanent magnet 60 and its associated pole pieces 61 and 62 are generally cylindrical in shape with the axis 57 acting as an axis of a figure of revolution. The bobbin is a cylinder with the same axis, with the coils 51 and 52 being annular in shape. Return path member 64 also is annular and surrounds the magnet, etc. The magnet is held centrally by support rods 71 projecting inwardly from the return path member, through slots in bobbin 49. The flat springs 56 and 58 correspondingly centralize the bobbin while allowing limited longitudinal motion of the same as aforesaid. Suitable electrical leads 72 for the windings and other electrical parts pass into the housing through potted feedthroughs 73.

Figure 7A:
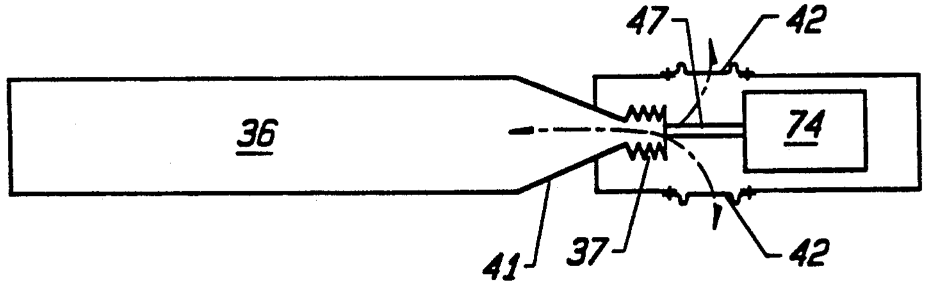
FIG. 7A is a schematic view corresponding to the implementation of the invention shown in FIGS. 3-6.
Figure 7B:
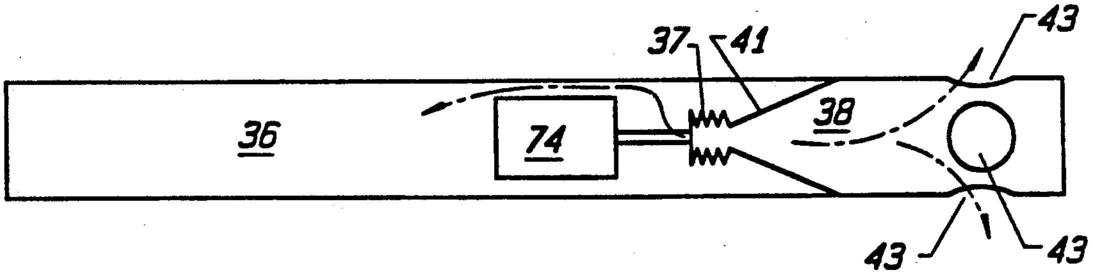
FIG. 7B is a variation on such implementation.

FIG. 7A illustrates the implementation described above in schematic form. The resonator is represented at 36, the horn structure at 41, and the piston at 37. The driver shaft for the piston is represented at 47, whereas the driver mechanism itself is represented by box 74. FIG. 7B shows an alternate arrangement in which the driver is located within the resonator 76 and the piston 37 communicates directly with the borehole liquid which is allowed to flow in through windows 43. In this connection, such windows are open, i.e., do not include a diaphragm or other structure which prevents the borehole liquid from entering the chamber 38. It will be seen that in this arrangement the piston 37 and the horn structure 41 provide fluid-tight isolation between such chamber and the resonator 36. It will be recognized, though, that it also could be designed for the resonator 36 to be flooded by the borehole liquid. In this connection, it is desirable if it is designed to be so flooded that such resonator include a small bore filter or the like to exclude suspended particles. In any event, the driver itself should have its own inert fluid system because of close tolerances, and strong magnetic fields. The necessary use of certain materials in the same makes it prone to impairment by corrosion and contamination by particles, particularly magnetic ones.

Figure 8:
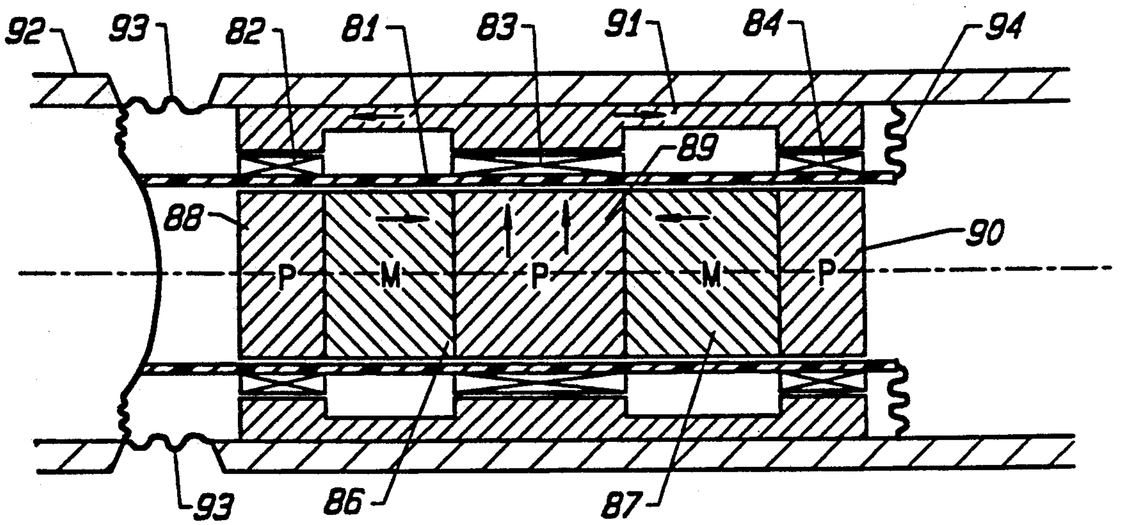
FIGS. 8 through 11 illustrate various alternate constructions.

FIGS. 8 through 12 are schematic illustrations representing various conceptual approaches and modifications for the invention, considered by applicant. FIG. 8 illustrates the modular design of the invention. In this connection, it should be noted that the invention is to be housed in a pipe of restricted diameter, but length is not critical. The invention enables one to make the best possible use of cross-sectional area while multiple modules can be stacked to improve efficiency and power capability.

The bobbin, represented at 81 in FIG. 8, carries three separate annular windings represented at 82–84. A pair of magnetic circuits are provided, with permanent magnets represented at 86 and 87 with facing magnetic polarities and poles 88–90. Return paths for both circuits are provided by an annular passive member 91.

It will be seen that the two magnetic circuits of the FIG. 8 configuration have the central pole 89 and its associated gap in common. The result is a three-coil driver with a transmitting efficiency (available acoustic power output/electric power input) greater than twice that of a single driver, because of the absence of fringing flux at the joint ends. Obviously, the process of "stacking" two coil drivers as indicated by this arrangement with alternating magnet polarities can be continued as long as desired with the common bobbin being appropriately supported. In this schematic arrangement, the bobbin is connected to a piston 85 which includes a central domed part and bellows or the like sealing the same to an outer casing represented at 92. This flexure seal support is preferred to sliding seals and bearings because the latter exhibit stiction that introduces distortion, particularly at the small displacements encountered when the transducer is used for receiving. Alternatively, a rigid piston can be sealed to the case with a bellows and a separate spring or spider used for centering. A spider represented at 94 can be used at the opposite end of the bobbin for centering the same. If such spider is metal, it can be insulated from the case and can be used for electrical connections to the moving windings, eliminating the flexible leads otherwise required.

Figure 9:
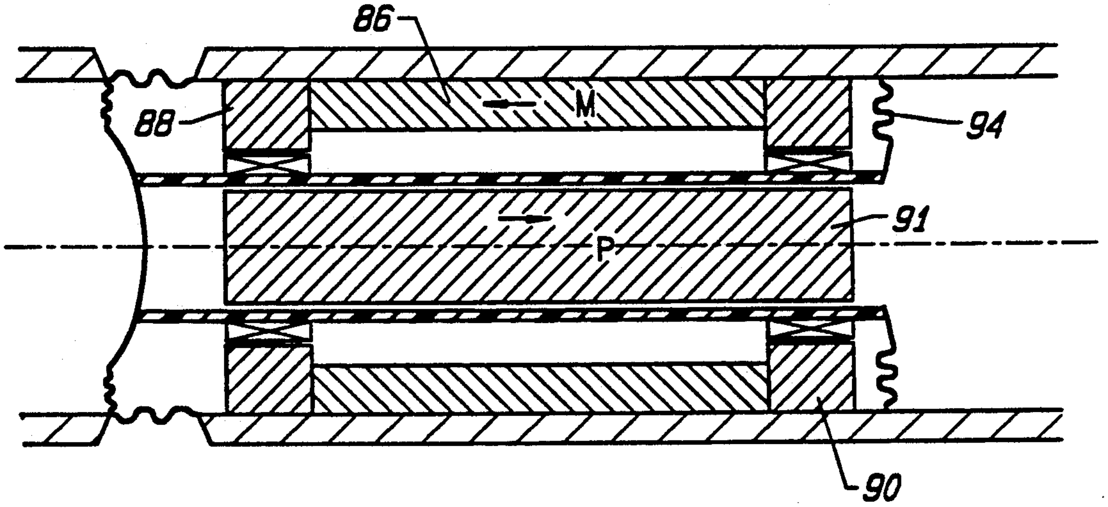

In the alternative schematically illustrated in FIG. 9, the magnet 86 is made annular and it surrounds a passive flux return path member 91 in its center. Since passive materials are available with saturation flux densities about twice the remanence of magnets, the design illustrated has the advantage of allowing a small diameter of the poles represented at 88 and 90 to reduce coil resistance and increase efficiency. The passive flux return path member 91 could be replaced by another permanent magnet. A two-magnet design, of course, could permit a reduction in length of the driver.

Figure 10:
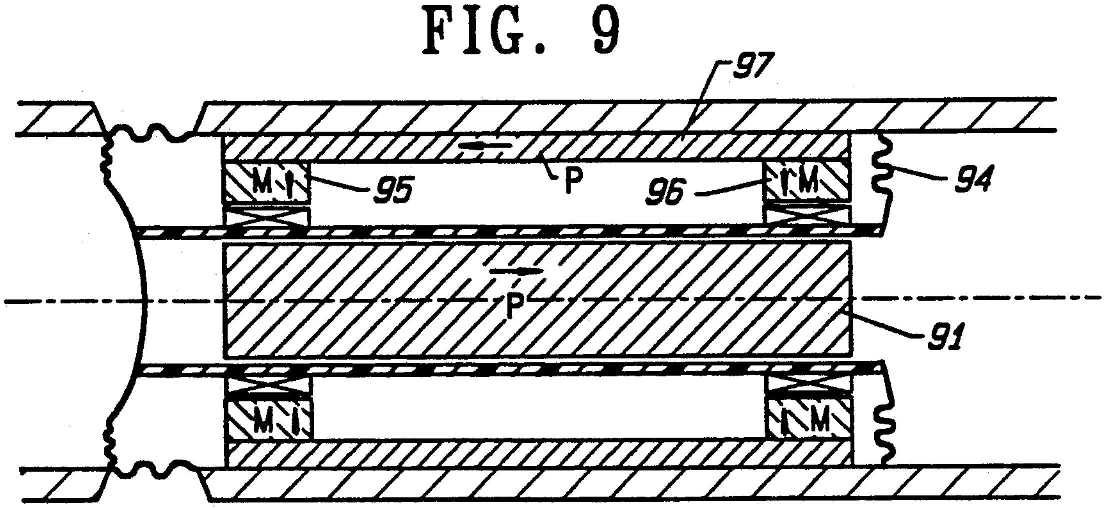

FIG. 10 schematically illustrates another magnetic structure for the driver. It includes a pair of oppositely radially polarized annular magnets 95 and 96. As illustrated, such magnets define the outer edges of the gaps. In this arrangement, an annular passive magnetic member 97 is provided, as well as a central return path member 91. While this arrangement has the advantage of reduced length due to a reduction of flux leakage at the gaps and low external flux leakage, it has the disadvantage of more difficult magnet fabrication and lower flux density in such gaps.

Figure 11:
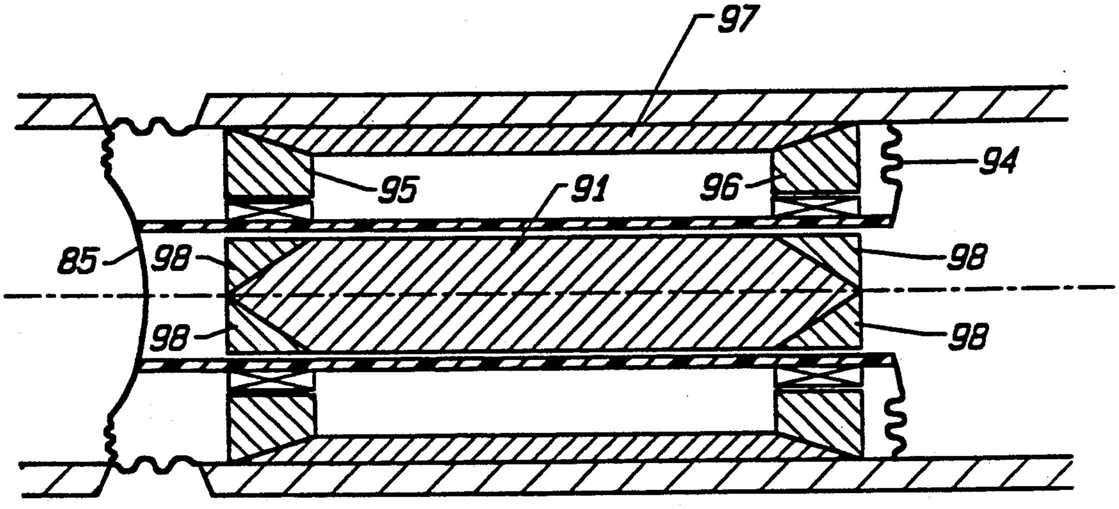

Conical interfaces can be provided between the magnets and pole pieces, i.e., the mating junctions can be made oblique to the long axis of the transducer. This construction maximizes the magnetic volume and its accompanying available energy while avoiding localized flux densities that could exceed a magnet remanence. It should be noted that any of the junctions, magnet-to-magnet, pole piece-to-pole piece and of course magnet-to-pole, piece can be made conical. FIG. 11 illustrates one arrangement for this feature. It should be noted that in this arrangement the magnets may include pieces 98 at the ends of the passive flux return member 91 as illustrated.

Figure 12:
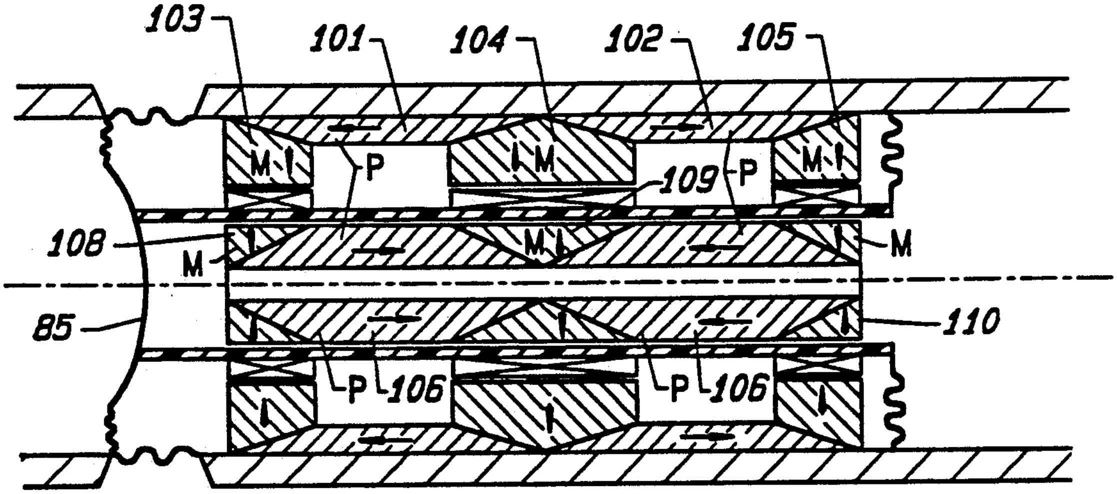
FIG. 12 illustrates in schematic form a preferred combination of such elements.

FIG. 12 schematically illustrates a particular combination of the options set forth in FIGS. 8 through 11 which could be considered a preferred embodiment for certain applications. It includes a pair of pole pieces 101 and 102 which mate conically with radial magnets 103, 104 and 105. The two magnetic circuits which are formed include passive return path members 106 and 107 terminating at the gaps in additional magnets 108 and 110.

An implementation of the invention incorporating some of the features mentioned above is illustrated in FIGS. 13 and 14. Such implementation includes two magnetic circuits, annular magnets defining the exterior of the magnetic circuit and a central pole piece. Moreover, the piston is in direct contact with the borehole liquid in the communication channel and the resonant chamber is filled with such liquid.

Figure 13:
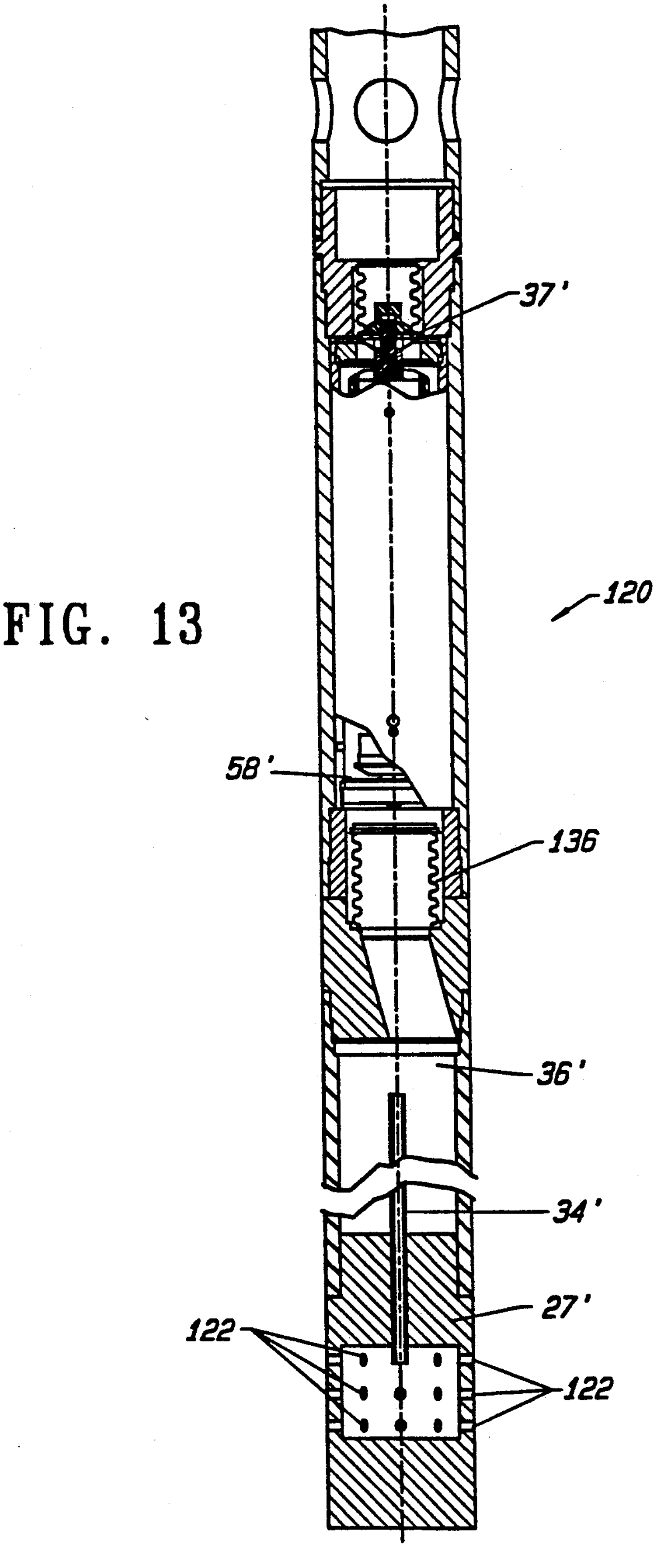
FIG. 13 is an overall sectional view of another implementation of the instant invention.
Figure 14:
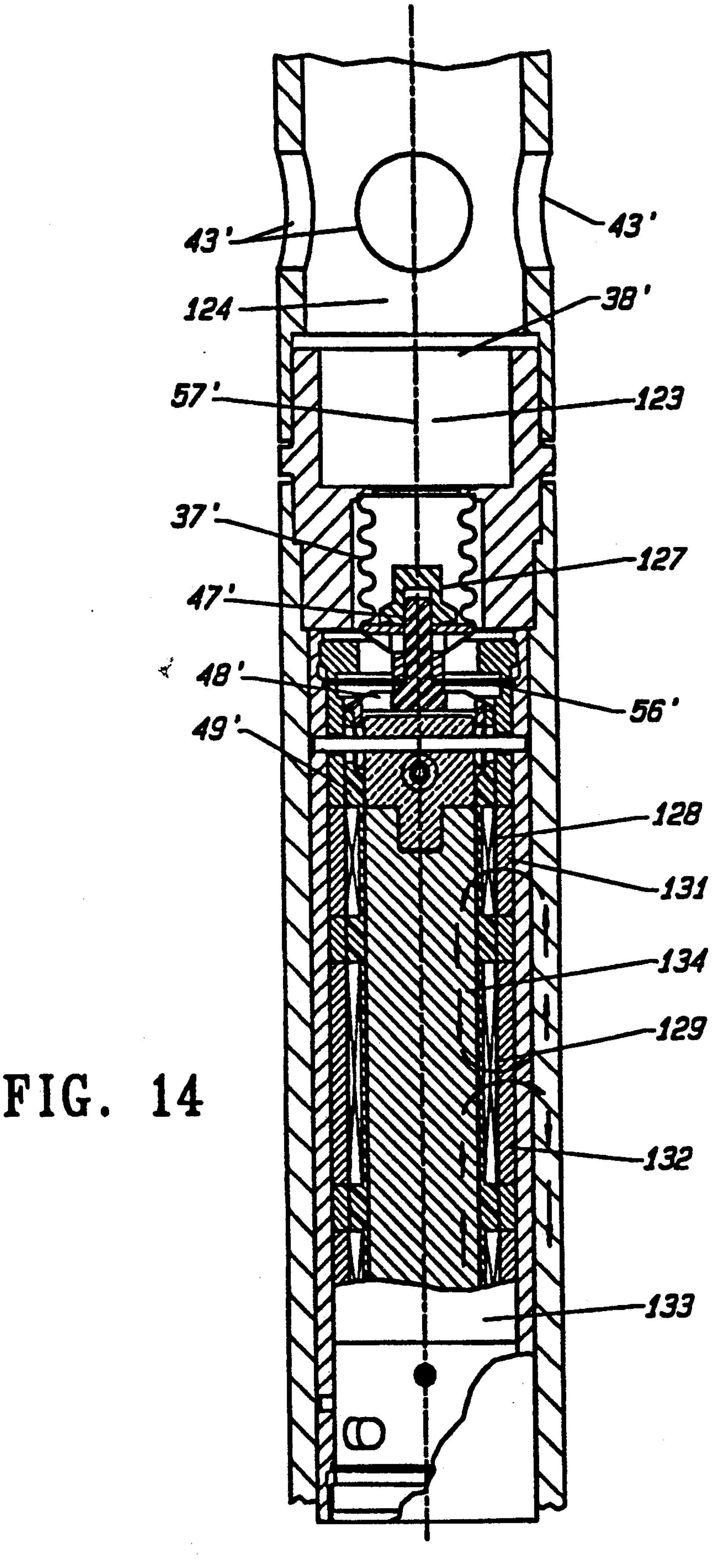
FIG. 14 is an enlarged sectional view of a portion of the construction shown in FIG. 13.

The implementation shown in FIGS. 13 and 14 is similar in many aspects to the implementation illustrated and described with respect to FIGS. 3 through 6. Common parts will be referred to by the same reference numerals used earlier, primed. This implementation includes many of the features of the earlier one, which features should be considered as being incorporated within the same, unless indicated otherwise.

The implementation of FIGS. 13 and 14 is generally referred to by the reference numeral 120. The resonator chamber 36′ is downhole of the piston 37′ and its driver in this arrangement, and is allowed to be filled with borehole liquid rather than being filled with a special liquid as described in connection with the earlier implementation. In this connection, the bladder and its associated housing is eliminated and the end plug 27′ is threaded directly into the resonator chamber 36. Such end plug includes a plurality of elongated bores 122 which communicate the borehole with tube 34′ extending into the resonator 36. As with the previously described implementation, the tube 34′ is nominally a quarter of the communication wavelength long in the resonator fluid, i.e., the borehole liquid in this implementation. The diameter of the bores 122 is selected relative to the interior diameter of tube 34′ to assure that no particulate matter from the borehole liquid which is of a sufficiently large size to block such tube will enter the same.

It will be recognized that while with this arrangement the chamber 36′ which provides a compliant backload for movement of the piston 37′ is in direct communication with the borehole liquid in the communication channel through the tube 34′, acoustic wave energy in the same will not be transmitted to the exterior of the chamber because of attenuation by such tube.

Piston 37′ is a bellows as described in the earlier implementation and acts to isolate the driver for the same to be described from a chamber 38′ which is allowed to be filled with the borehole liquid. Such chamber 38′ is illustrated as having two parts, parts 123 and 124, that communicate directly with one another. As illustrated, windows 43′ extend to the annulus surrounding the transducer construction without the intermediary of isolating diaphragms as in the previous implementation. Thus, in this implementation the piston 37' is in direct contact with borehole liquid which fills the chamber 38'.

The piston 37' is connected via a nut 127 and driving shaft 128 to the driver mechanism. To this end, the driving shaft 128 is connected to an end cap 48' of a tubular bobbin 49'. The bobbin 49' carries three annular coils or windings in a corresponding number of radial gaps of two closed loop magnetic circuits to be described. Two of these windings are represented at 128 and 129. The third winding is on the axial side of winding 129 opposite that of winding 128 in accordance with the arrangement shown in FIG. 8. Moreover, winding 29 is twice the axial length of winding 128. The bobbin 49' is constrained in position similarly to bobbin 49' by springs 56' and 58'.

The driver in this implementation conceptually is a hybrid of the approaches illustrated in FIGS. 8 and 9. That is, it includes two adjacent magnetic circuits sharing a common pathway. Moreover, the permanent magnets are annular surrounding a solid core providing a passive member. In more detail, three magnets illustrated in FIG. 14 at 131, 132 and 133, develop flux which flows across the gaps within which the windings previously described ride to a solid, cylindrical core passive member 132. The magnetic circuits are completed by an annular casing 134 which surrounds the magnets. Such casing 134 is fluid tight and acts to isolate the driver as described from the borehole liquid. In this connection, it includes at its end spaced from piston 37', an isolation bellows 136 which transmits pressure changes caused in the driver casing 132 to the resonator 36'. The bellows 136 is free floating in the sense that it is not physically connected to the tubular bobbin 49' and simply flexes to accommodate the pressure changes of the special fluid in the driver casing. It sits within a central cavity or borehole 37 within a plug 38 that extends between the driver casing and the wall of the resonant chamber 36'. An elongated hole or aperture 139 connects the interior of the bellows 136 with the resonator chamber.

Figure 15A:
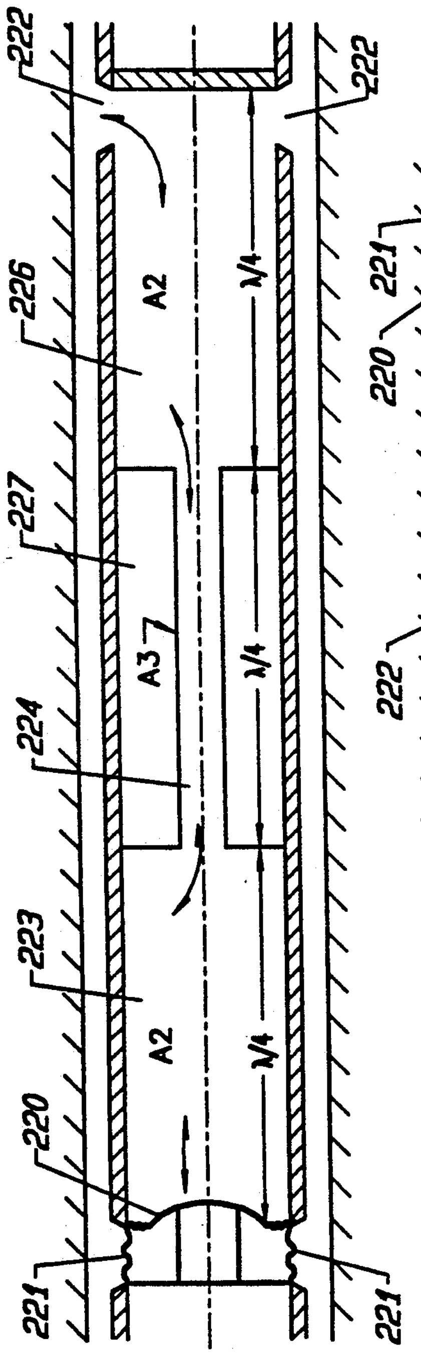
FIGS. 15A-15C illustrate in schematic cross-section various constructions of a directional coupler portion of the invention.
Figure 15B:
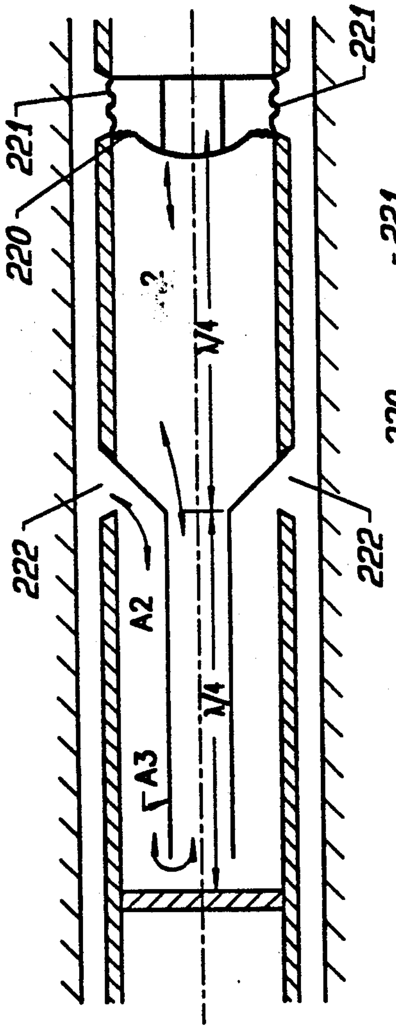
Figure 15C:
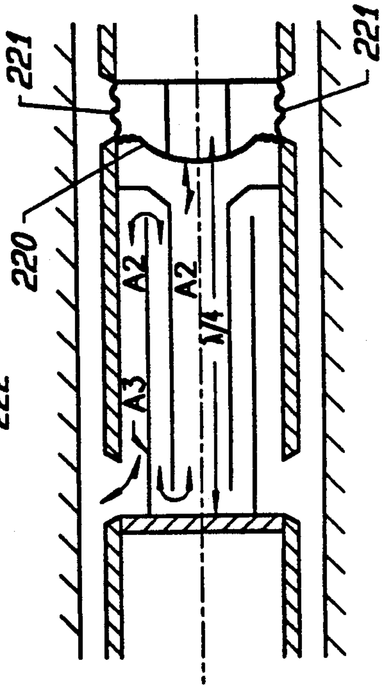

A passive directional coupling arrangement is conceptually illustrated by FIGS. 15A–15C. The piston of the transducer is represented at 220. Its design is based on the fact that the acoustic characteristic admittance in a cylindrical waveguide is proportional to its cross-sectional area. The windows for transmission of the communicating acoustic energy to the borehole fluid in the communication channel are represented at 221. A second port or annular series of ports 222 are located either three-quarters wavelength (FIG. 15A) or one-quarter wavelength (FIGS. 15B and C) from the windows 221. The coupler is divided into three-quarter wavelength sections 223–226. The cross-sectional area of these sections are selected to minimize any mismatch which might defeat directional coupling. Center section 224 has a cross-sectional area $A_3$ which is nominally equal to the square of the cross-sectional area of sections 223 and 226 ($A_2$) divided by the annular cross-section of the borehole at the location of the ports 221 and 222. The reduced cross-sectional area of section 224 is obtained by including an annular restriction 227 in the same.

The directional coupler is in direct contact with the backside of the piston 220, with the result that acoustic wave energy will be introduced into the coupler which is 180° out-of-phase with that of the desired communication. The relationship of the cross-sectional areas described previously will assure that the acoustic energy which emanates from the port 222 will cancel any transmission from port 221 which otherwise would travel toward port 222.

The version of the directional coupler represented in FIG. 15A is full length, requiring a three-quarter wavelength long tubing, i.e., the chamber is divided into three, quarter-wavelength-long sections. The versions represented in FIGS. 15B and 15C are folded versions, thereby reducing the length required. That is, the version in FIG. 15B is folded once with the sectional areas of the sections meeting the criteria discussed previously. Two of the chamber sections are coaxial with one another. The version represented in FIG. 15C is folded twice. That is, all three sections are coaxial. The two versions in FIGS. 15B and 15C are one-fourth wavelength from the port 222 and thus are on the "uphole" side of port 221 as illustrated. It will be recognized, though, that the bandwidth of effective directional coupling is reduced with folding.

It will be recognized that in any of the configurations of FIGS. 15A–15C, the port 222 could contain a diaphragm or bellows, an expansion chamber could be added and a filling fluid other than well fluid could be used. Additional contouring of area could also be done to modify coupling bandwidth and efficiency. Shaping of ports and arraying of multiple ports could also be done for the same purpose.

Directional coupling also could be obtained by using two or more transducers of the invention as described with ports axially separated to synthesize a phased array. The directional coupling would be achieved by driving each transducer with a signal appropriately predistorted in phase and amplitude. Such active directional coupling can be achieved over a wider bandwidth than that achieved with a passive system. Of course, the predistortion functions would have to account for all coupled resonances in each particular situation.

The invention has been described in connection with various preferred embodiments thereof, including modifications and options which have occurred to applicant. As mentioned previously, though, these should be considered to be exemplary, rather than exhaustive. It is therefore intended that the coverage afforded applicant be defined only by the claims and equivalents.

What is claimed is

1. A borehole acoustic communication transducer for converting between electrical power and acoustical power defined by acoustic waves travelling lengthwise in a borehole with liquid therein being the transmission medium, comprising:

a generally elongated housing for enclosing said transducer at a downhole location in said borehole;

means in said housing defining at least one magnetic circuit having a plurality of gaps spaced lengthwise in said housing;

a multiple number of electrical windings in said housing, each of which is in a corresponding one of said gaps for interaction with magnetic flux flowing therethrough;

a piston in said housing connected to said multiple number of windings for movement therewith in a force additive manner;

at least one side of said piston positioned to interact with a liquid in a communication channel of said borehole either to radiate acoustic waves into the same or to receive acoustic power therefrom:

wherein during a transmission mode of operation, said piston is responsive to an electrical signal pattern, in selected ones of said multiple number of electrical windings, which is representative of a coded signal and will radiate an acoustic pulse pattern in said liquid corresponding thereto; and wherein during a reception mode of operation, said piston is responsive to an acoustic pulse pattern in said liquid which is representative of a coded signal which is developed in said liquid at a remote location communication mode, and which will cooperate in generating an electrical signal corresponding thereto in selected ones of said multiple number of electrical windings.

2. The borehole acoustic communication transducer of claim 1 wherein said magnetic circuit means defines a single magnetic circuit having a pair of spaced apart gaps therein, and there are two of said electrical windings, each of which is in a respective one of said gaps.

3. The borehole acoustic communication transducer of claim 1 wherein said magnetic circuit means defines a multiple number of said magnetic circuits spaced together lengthwise of said housing, adjacent ones having a common pathway for flux within which there is a gap for an electrical winding.

4. The borehole acoustic communication transducer of claim 3 wherein there are two of said magnetic circuits spaced lengthwise of said housing sharing a common pathway for flux.

5. The borehole acoustic communication transducer of claim 1 wherein said housing is surrounded at said downhole location by an annular space containing said borehole liquid transmission medium and said annular space acts as a communication channel for communication by said transducer.

6. The borehole acoustic communication transducer of claim 1 wherein the cross-sectional area of said communication channel in the section of said borehole having said location at which said piston interacts therewith is appreciably different that the communication channel cross-sectional area in an adjacent section of said borehole, further comprising a transition section between said borehole sections having a cross-sectional area and length selected to match the impedance of transmission of acoustic wavelengths through said liquid at said borehole sections.

7. The borehole acoustic communication transducer of claim 6 wherein said transition section is about one-quarter wavelength long relative to the nominal frequency of the central wavelength of potential communication waves at said section and the cross-sectional area of liquid within said borehole at said transition section is essentially the square root of the product of the cross-sectional areas of liquid at said adjacent borehole sections.

8. The borehole acoustic communication transducer of claim 1 further including means at least partially responsible for preferentially directing longitudinal acoustic waves of a selected frequency in a desired communication direction lengthwise of said borehole.

9. The borehole acoustic communication transducer of claim 8 wherein said directing means includes a step increase in the liquid cross-sectional area in said borehole communication channel, spaced from said transducer generally an odd number of quarter wavelengths nominally about the central wavelength of potential communication by said acoustic waves, said step area increase being positioned lengthwise in said borehole in a direction from said transducer opposite that desired for said communication.

10. The borehole acoustic communication transducer of claim 8 wherein there are a multiple number of said step area increases at odd multiples, and step area decreases at even multiples of a nominal quarter-wavelength are interleaved therewith.

11. The borehole acoustic communication transducer of claim 8 further including a chamber defining a compliant back-load for said piston, and said directing means includes a window in said chamber between a portion thereof communicating with said piston and a portion thereof communicating with liquid in said borehole communication channel, said window being spaced from the location at which said transducer interacts with said liquid by generally an odd number of quarter wavelengths of the nominal frequency of the central wavelength of potential communication waves at the locations of said window and the point of said interaction.

12. The borehole acoustic communication transducer of claim 1 further including a compliant back-load for said piston.

13. The borehole acoustic communication transducer of claim 12 wherein said compliant back-load is acoustically isolated from said communication channel.

14. The borehole acoustic communication transducer of claim 1 wherein said magnetic circuit defined by said means includes at least one closed loop path fully within said housing having at least one permanent magnet responsible for said magnetic flux.

15. The borehole acoustic communication transducer of claim 14 wherein there are a plurality of said permanent magnets adjacent radially to both sides of at least one of said gaps.

16. The borehole acoustic communication transducer of claim 14 wherein said permanent magnet is on one radial side of said gaps, and a magnetically passive member of magnetically permeable material is on the other radial side thereof extending between said gaps and defining a magnetic conduction path for flux flowing between such gaps.

17. The borehole acoustic communication transducer of claim 16 wherein said transducer is elongated, said magnet extends along the longitudinal central axis of said transducer, and said passive member is annular in shape and surrounds said magnet.

18. The borehole acoustic communication transducer of claim 16 wherein said transducer is elongated, said passive member of magnetically permeable material extends along the longitudinal central axis of said transducer, and said permanent magnet is annular in shape and surrounds said passive member.

19. The borehole acoustic communication transducer of claim 14 further including at least one magnetically passive member of magnetically permeable material mating with said permanent magnet and at least partially defining said closed loop path, the mating junction between said permanent magnet and said passive member being oblique to the longitudinal central axis of said transducer.

20. A borehole acoustic communication transducer for converting between electrical power and acoustical power defined by acoustic waves travelling lengthwise in a borehole with liquid therein being the transmission medium, comprising:

a generally elongated housing for enclosing said transducer at a downhole location in said borehole, said housing being surrounded at said downhole location by an annular space containing said borehole liquid transmission medium;

means in said housing including a plurality of permanent magnets defining a multiple number of closed loop path magnetic circuits fully within said housing and having gaps therein, adjacent ones of said circuits sharing a common pathway for flux within which there is one of said gaps;

electrical windings in said gaps for interaction with magnetic flux flowing therethrough;

a piston in said housing connected to said windings for movement therewith in a force additive manner, at least one side of which is positioned to interact with a liquid in a communication channel of said borehole either to radiate acoustic waves into the same or to receive acoustic power therefrom, said housing including a window therein facilitating said interaction of said one side of said piston with said liquid, the cross-sectional area in said communication channel in the section of said borehole having said location at which said piston interacts therewith being appreciably different than the cross-sectional area in an adjacent section of said borehole;

a transition section in said communication channel between said borehole sections having a cross-sectional area and length selected to match the impedance of transmission of acoustic wavelengths through said communication channel at said borehole sections, said transition section being about one-quarter wavelength long relative to the nominal frequency of the central wavelength of potential communication waves at said section and the cross-sectional area of liquid within said borehole at said transition section being essentially the square root of the product of the cross-sectional areas of liquid in said adjacent borehole sections;

a multiple number of step increases in the liquid cross-sectional areas in said borehole communication channel, spaced from said transducer generally an odd number of quarter wavelengths nominally about the central wavelength of potential communication by said acoustic waves, said step increases being positioned lengthwise in said borehole in a direction from said transducer opposite that desired for said communication; and a multiple number of step decreases in the liquid cross-sectional area in said borehole, interleaved with said step increases and spaced from said transducer generally an even number of quarter wavelengths nominally about the central wavelength of potential communication by said acoustic waves.

21. The borehole acoustic transducer of claim 20 further including a magnetically passive member of magnetically permeable material within said housing mating with at least one of said permanent magnets and defining at least partially one of said closed loop paths, the mating junction between said permanent magnet and said passive member being oblique to the longitudinal central axis of said transducer.

22. A borehole acoustic communication transducer for converting between electrical power and acoustical power defined by acoustic waves travelling lengthwise in a borehole with liquid therein being the transmission medium, comprising:

a generally elongated housing for enclosing said transducer at a downhole location in said borehole, said housing being surrounded at said downhole location by an annular space containing said borehole liquid transmission medium;

means in said housing defining a closed loop path magnetic circuit within said housing having at least two gaps spaced apart lengthwise;

at least two electrical windings in said housing, each of which is in a corresponding one of said gaps for interaction with magnetic flux flowing therethrough;

a piston in said housing connected to said windings for movement therewith in a force additive manner, at least one side of which is positioned to interact with a liquid in a communication channel of said borehole either to radiate acoustic waves into the same or to receive acoustic power therefrom, said housing including a window therein facilitating said interaction of said one side of said piston with said liquid, the cross-sectional area in said communication channel in the section of said borehole having said location at which said piston interacts therewith being appreciably different that the cross-sectional area in an adjacent section of said borehole;

a transition section in said communication channel between said borehole sections having a cross-sectional area and length selected to match the impedance of transmission of acoustic wavelengths through said communication channel at said borehole sections, said transition section being about one-quarter wavelength long relative to the nominal frequency of the central wavelength of potential communication waves at said section and the cross-sectional area of liquid within said borehole at said transition section being essentially the square root of the product of the cross-sectional areas of liquid in said adjacent borehole sections; and a step increase in the liquid cross-sectional area in said borehole communication channel, spaced from said transducer generally an odd number of quarter wavelengths nominally about the central wavelength of potential communication by said acoustic waves, said step area increase being positioned lengthwise in said borehole in a direction from said transducer opposite that desired for said communication.

23. The borehole acoustic communication transducer of claim 22 further including a chamber defining a compliant back-load for said piston, a window in said chamber between a portion thereof communicating with said piston and a portion thereof communicating with liquid in said borehole communication channel, said window being spaced from the location at which said transducer interacts with said liquid by generally an odd number of quarter wavelengths of the nominal frequency of the central wavelength of potential communication waves at the locations of said window and the point of said interaction.

24. The borehole acoustic communication transducer of claim 22 further including a magnetically passive member of magnetically permeable material within said housing mating with the least one of said permanent magnets and defining at least partially one of said closed loop paths, the mating junction between said permanent magnet and said passive member being oblique to the longitudinal central axis of said transducer.

25. A borehole acoustic communication transducer for converting between electrical power and acoustical power defined by transmitting acoustical waves travelling lengthwise in a borehole with liquid therein being the transmission medium, comprising:

actuator means including a single actuator member for selected bidirectional conversion of (a) a provided coded electrical signal to a corresponding generated coded acoustic signal during a message transmission mode of operation, and (b) a provided coded acoustic signal to a corresponding generated coded electrical signal during a message reception mode of operation; and means at least partially responsible for preferentially directing said generated coded acoustic signal in a desired communication direction, including a step increase in the liquid cross-sectional area in said borehole communication channel, spaced from said transducer generally an odd number of quarter-wavelengths nominally about the central wavelength of communication by said acoustic waves, said step area increase being positioned lengthwise in said borehole in a direction from said transducer opposite that desired for said communication.

26. The borehole acoustic communication transducer of claim 25 wherein there are a multiple number of said step area increases at odd multiples, and step area decreases at even multiples of a nominal quarter-wavelength are interleaved therewith.

27. A borehole acoustic communication transducer for converting between electrical power and acoustical power defined by transmitting acoustical waves travelling lengthwise in a borehole with liquid therein being the transmission medium, comprising:

actuator means including a single actuator member for selected bidirectional conversion of (a) a provided coded electrical signal to a corresponding generated coded acoustic signal during a message transmission mode of operation, and (b) a provided coded acoustic signal to a corresponding generated coded electrical signal during a message reception mode of operation;

means at least partially responsible for preferentially directing said generated coded acoustic signal in a desired communication direction; and further including a chamber defining a compliant back-load for said actuator means, and said directing means includes a window in said chamber between a portion thereof communicating with liquid in said borehole communication channel, said window being spaced from the location at which said transducer interacts with said liquid by generally an odd number of quarter wavelengths of the nominal frequency of potential communication waves at the locations of said window and said interaction.

28. The borehole acoustic communication transducer of claim 27 wherein said chamber is three-quarters of said wavelength long.

29. The borehole acoustic communication transducer of claim 28 wherein said chamber is divided into three sections, each one of which is about one-quarter of said wavelength long and two of said sections are coaxial with one another.

30. The borehole acoustic communication transducer of claim 29 wherein the third one of said sections is also coaxial with the other two ones of such sections.

31. The borehole acoustic communication transducer of claim 5 wherein said housing includes a window therein facilitating said interaction of said one side of said piston with said liquid.

32. An acoustic borehole communication transceiver, for use in a borehole having at least one tubular conduit string disposed therein which is in contact with a transmission liquid which extends from a borehole region adjacent said acoustic borehole communication transceiver to a remotely located communication node, comprising:

a housing for enclosing said acoustic borehole communication transceiver, including means for coupling said housing in a selected location in said at least one tubular conduit string;

a single actuator member, carried by said housing, and in force-transferring contact with said transmission liquid, said single actuator member being selectively operable in a transmission mode of operation and a reception mode of operation, wherein:

during said transmission mode of operation, said single actuator member is responsive to an electrical signal pattern which is representative of a coded signal and will generate an acoustic pulse pattern in said transmission liquid corresponding thereto, and direct said acoustic pulse pattern to said remotely located communication node; and during said reception mode of operation, said single actuator member is responsive to an acoustic pulse pattern in said transmission liquid which is representative of a coded signal which is developed at said remotely located communication node, and will generate an electrical signal pattern corresponding thereto which is representative of said coded signal.

33. An acoustic borehole communication transceiver, for use in a borehole having at least one tubular conduit string disposed wherein which is in contact with a transmission liquid which extends from a borehole region adjacent said acoustic borehole communication transceiver to a remotely located communication node, comprising:

a housing for enclosing said acoustic borehole communication transceiver, including means for coupling said housing in a selected location in said at least one tubular conduit string;

an actuator member carried by said housing, in force-transferring contact with said transmission liquid of said wellbore, and including:

a stator portion formed at least in-part of a magnetically permeable material;

a transducer portion formed at least in-part of a magnetically permeable material, and which is movable relative to said stator portion;

at least one magnetic field source in field-transference coupling with at least one of said stator portion and said transducer portion for providing a selected magnetic flux;

wherein at least one substantially closed-loop magnetic flux pathway is defined in said actuator member which includes said stator portion and said transducer portion as flux pathway components, for accepting said selected magnetic flux from said at least one magnetic field source;

at least one electrical current pathway carried by said transducer portion which traverses said at least one substantially closed-loop magnetic pathway;

wherein said transducer portion is operable in a plurality of modes, including:

a transmission mode of operation, wherein electrical current is selectively supplied to said at least one electrical current pathway, and electric current and magnetic flux interaction gives rise to a displacement force which is applied to said transducer portion resulting in displacement of said transducer portion relative to said stator portion causing said actuator member to generate an acoustic signal in said transmission liquid for transmission to said remotely located communication node; and a reception mode of operation, wherein acoustic signals developed in said transmission liquid at said remotely located communication node which are supplied to said actuator member provided a displacement force which is applied to said transducer portion resulting in displacement of said transducer portion relative to said stator portion, and wherein interaction between said selected magnetic flux and said at least one electrical current pathway generates a current in said at least one electrical current pathway which is representative of said acoustic signals in said transmission liquid.

34. An acoustic borehole communication transceiver, for use in a borehole having at least one tubular conduit string disposed therein which is in contact with a transmission liquid which extends from a borehole region adjacent said acoustic borehole communication transceiver to a remotely located communication node, comprising:

a housing for enclosing said acoustic borehole communication transceiver, including means for coupling said housing in a selected location in said at least one tubular conduit string;

an actuator member carried by said housing, in force-transferring contact with said transmission liquid of said wellbore, and including:

a stator portion formed at least in-part of a magnetically permeable material;

a bobbin portion formed at least in-part of a magnetically permeable material, and which is axially movable relative to said stator portion over a selected distance range;

at least one magnetic field source in field-transference coupling with at least one of said stator portion and said bobbin portion for providing a selected magnetic flux;

wherein at least one substantially closed-loop magnetic flux pathway is defined in said actuator member which includes said stator portion and said bobbin portion as flux pathway components, for accepting said selected magnetic flux from said at least on magnetic field source;

at least one electrical current pathway carried by said bobbin portion which traverses said at least one substantially closed-loop flux pathway;

wherein said acoustic borehole transceiver is operable in a plurality of modes, including:

a transmission mode of operation, wherein electrical current is selectively supplied to said at least one electrical current pathway, and electric current and magnetic flux interaction gives rise to a displacement force which is applied to said bobbin portion resulting in axial displacement of said bobbin portion relative to said stator portion causing said actuator member to generate an acoustic signal in said transmission liquid for transmission to said remotely located communication node; and a reception mode of operation, wherein acoustic signals developed in said transmission liquid at said remotely located communication node which are supplied to said actuator member provide a displacement force which is applied to said bobbin portion resulting in axial displacement of said bobbin portion relative to said stator portion, and wherein interaction between said selected magnetic flux and said at least one electrical current pathway generates a current in said at least on electrical current pathway which is representative of said acoustic signals in said transmission liquid.

35. An acoustic borehole communication transceiver according to claim 34, wherein said at least one magnetic field source provides a substantially constant magnetic field.

36. An acoustic borehole communication transceiver according to claim 34, wherein said at least one magnetic field source comprises at least one permanent magnet.

37. An acoustic borehole communication transceiver according to claim 34, wherein said stator portion defines a substantially cylindrical bobbin bore which receives said bobbin portion.

38. An acoustic borehole communication transducer, for use in a borehole having at least one tubular conduit string disposed therein which is in contact with a transmission liquid which extends from a borehole region adjacent said acoustic borehole communication transducer to a remotely located communication node, comprising:

a housing for enclosing said acoustic borehole communication transducer, including means for coupling said housing in a selected location in said at least one tubular conduit string;

an actuator member carried by said housing, in force-transferring contact with said transmission liquid of said wellbore, and including:

a stator portion formed at least in-part of a magnetically permeable material;

a force-transference portion formed at least in-part of a magnetically permeable material, and which is movable relative to said stator portion;

at least one magnetic field source in field-transference coupling with at least one of said stator portion and said force-transference portion for providing a selected magnetic flux;

wherein at least one substantially closed-loop magnetic flux pathway is defined in said actuator member which includes said stator portion and said force-transference portion as flux pathway components, for accepting said selected magnetic flux from said at least one magnetic field source;

at least one electrical current pathway carried by said force-transference portion which traverses said at least one substantially closed-loop magnetic flux pathway;

wherein said acoustic borehole communication transducer is operable in at least a transmission mode of operation, wherein electrical current is selectively supplied to said at least one electrical current pathway, and wherein electric current and magnetic flux interaction gives rise to a displacement force which is applied to said force-transference portion resulting in displacement of said force-transference portion relative to said stator portion causing said actuator member to generate an acoustic signal in said transmission liquid for transmission to said remotely located communication node.

39. An acoustic borehole communication transducer, for use in a borehole having at least one tubular conduit string disposed therein which is in contact with a transmission liquid which extends from a borehole region adjacent said acoustic borehole communication transducer to a remotely located communication node, comprising:

a housing for enclosing said acoustic borehole communication transducer, including means for coupling said housing in a selected location in said at least one tubular conduit string;

an actuator member carried by said housing, in force-transferring contact with said transmission liquid of said wellbore, and including:

a stator portion formed at least in-part of a magnetically permeable material;

a force-transference portion formed at least in-part of a magnetically permeable material, and which is movable relative to said stator portion;

at least one magnetic field source in field-transference coupling with at least one of said stator portion and said force-transference portion for providing a selected magnetic flux;

wherein at least one substantially closed-loop magnetic flux pathway is defined in said actuator member which includes said stator portion and said force-transference portion as flux pathway components, for accepting said selected magnetic flux from said at least one magnetic field source;

at least one electrical current pathway carried by said force-transference portion which traverses said at least one substantially closed-loop magnetic flux pathway;

wherein said transducer portion is operable in at least a reception mode of operation, wherein acoustic signals developed in said transmission liquid which are supplied to said actuator member provide a displacement force which is applied to force-transference portion resulting in displacement of said force-transference portion relative to said stator portion, and wherein interaction between said selected magnetic flux and said at least one electrical current pathway generates a current in said at least one electrical current pathway which is representative of said acoustic signals in said transmission liquid.

40. An acoustic borehole communication transducer, for use in a borehole having at least one tubular conduit string disposed therein which is in contact with a transmission liquid which extends from a borehole region adjacent said acoustic borehole communication transducer to a remotely located communication node, comprising:

a housing for enclosing said acoustic borehole communication transducer, including means for coupling said housing in a selected location in said at least one tubular conduit string;

an actuator member carried by said housing, in force-transferring contact with said transmission liquid of said wellbore, and including:

a stator portion formed at least in-part of a magnetically permeable material;

a force-transference portion formed at least in-part of a magnetically permeable material, and which is axially movable relative to said stator portion over a selected distance range;

at least one magnetic field source in field-transference coupling with at least one of said stator portion and said force-transference portion for providing a selected magnetic flux;

wherein at least one substantially closed-loop magnetic flux pathway is defined in said actuator member which includes said stator portion and said force-transference portion as flux pathway components, for accepting said selected magnetic flux from said at least one magnetic field source;

at least one electrical current pathway carried by said force-transference portion which traverses said at least one substantially closed-loop flux pathway;

wherein said acoustic borehole transducer is operable in at least a transmission mode of operation, wherein electrical current is selectively supplied to said at least one electrical current pathway, and wherein electric current and magnetic flux interaction gives rise to a displacement force which is applied to said force-transference portion resulting in axial displacement of said force-transference portion relative to said stator portion causing said actuator member to generate an acoustic signal in said transmission liquid for transmission to said remotely located communication node.

41. An acoustic borehole communication transducer, for use in a borehole having at least one tubular conduit string disposed therein which is in contact with a transmission liquid which extends from a borehole region adjacent said acoustic borehole communication transducer to a remotely located communication node, comprising:

a housing for enclosing said acoustic borehole communication transducer, including means for coupling said housing in a selected location in said at least one tubular conduit string;

an actuator member carried by said housing, in force-transferring contact with said transmission liquid of said wellbore, and including:

a stator portion formed at least in-part of a magnetically permeable material;

a force-transference portion formed at least in-part of a magnetically permeable material, and which is axially movable relative to said stator portion over a selected distance range;

at least one magnetic field source in field-transference coupling with at least one of said stator portion and said force-transference portion for providing a selected magnetic flux;

wherein at least one substantially closed-loop magnetic flux pathway is defined in said actuator member which includes said stator portion and said force-transference portion as flux pathway components, for accepting said selected magnetic flux from said at least one magnetic field source;

at least one electrical current pathway carried by said force-transference portion which traverses said at least one substantially closed-loop flux pathway;

wherein said acoustic borehole transducer is operable in at least a reception mode of operation, wherein acoustic signals developed in said transmission liquid which are supplied to said actuator member provide a displacement force which is applied to said force-transference portion resulting in axial displacement of said force-transference portion relative to said stator portion, and wherein interaction between said magnetic flux and said at least one electrical current pathway generates a current in said at least one electrical current pathway which is representative of said acoustic signals in said transmission liquid.

42. An acoustic borehole communication transceiver, for use in a borehole having a fluid column therein which is composed of a transmission liquid which extends from a borehole region adjacent said acoustic borehole communication transceiver to a remotely located communication node, comprising:

a housing for enclosing said acoustic borehole communication transceiver;

a single actuator member, carried by said housing, and in force-transferring contact with said transmission liquid, said single actuator member being selectively operable in a transmission mode of operation and a reception mode of operation, wherein:

during said transmission mode of operation, said single actuator member is responsive to an electrical signal pattern which is representative of a coded signal and will generate an acoustic pulse pattern in said transmission liquid corresponding thereto, and direct said acoustic pulse pattern to said remotely located communication node; and during said reception mode of operation, said single actuator is responsive to an acoustic pulse pattern in said transmission liquid which is representative of a coded signal and which is developed at said remotely location communication node, and will generate an electrical signal pattern corresponding thereto which is representative of said coded signal.

43. An acoustic borehole communication transceiver, for use in a borehole having a fluid column therein which is composed of a transmission liquid which extends from a borehole region adjacent said acoustic borehole communication transceiver to a remotely located communication node, comprising:

a housing for enclosing said acoustic borehole communication transceiver;

an actuator member carried by said housing, in force-transferring contact with said transmission liquid of said wellbore, and including:

a stator portion formed at least in-part of a magnetically permeable material;

a transducer portion formed at least in-part of a magnetically permeable material, and which is movable relative to said stator portion;

at least one magnetic field source in field-transference coupling with at least one of said stator portion and said transducer portion for providing a selected magnetic flux;

wherein at least one substantially closed-loop magnetic flux pathway is defined in said actuator member which includes said stator portion and said transducer portion as flux pathway components, for accepting said selected magnetic flux from said at least one magnetic field source;

at least one electrical current pathway carried by said transducer portion which traverses said at lest one substantially closed-loop magnetic flux pathway;

wherein said transducer portion is operable in a plurality of modes, including:

a transmission mode of operation, wherein electrical current is selectively supplied to said at least one electrical current pathway, and electric current and magnetic flux interaction gives rise to a displacement force which is applied to said transducer portion resulting in displacement of said transducer portion relative to said stator portion causing said actuator member to generate an acoustic signal in said transmission liquid for transmission to said remotely located communication node; and a reception mode of operation, wherein acoustic signals developed in said transmission liquid at said remotely located communication node which are supplied to said actuator member provide a displacement force which is applied to said transducer portion resulting in displacement of said transducer portion relative to said stator portion, and wherein interaction between said selected magnetic flux and said at least one electrical current pathway generates a current in said at least one electrical current pathway which is representative of said acoustic signals in said transmission liquid.

44. An acoustic borehole communication transceiver, for use in a borehole having a fluid column therein which is composed of a transmission liquid which extends from a borehole region adjacent said acoustic borehole communication transceiver to a remotely located communication node, comprising:

a housing for enclosing said acoustic borehole communication transceiver;

an actuator member carried by said housing, in force-transferring contact with said transmission liquid of said wellbore, and including:

a stator portion formed at least in-part of a magnetically permeable material;

a bobbin portion formed at least in-part of a magnetically permeable material, and which is axially movable relative to said stator portion over a selected distance range;

at least one magnetic field source in field-transference coupling with at least one of said stator portion and said bobbin portion for providing a selected magnetic flux;

wherein at least one substantially closed-loop magnetic flux pathway is defined in said actuator member which includes said stator portion and said bobbin portion as flux pathway components, for accepting said selected magnetic flux from said at least one magnetic field source;

at least one electrical current pathway carried by said bobbin portion which traverses said at least one substantially closed-loop flux pathway;

wherein said acoustic borehole transceiver is operable in a plurality of modes, including:

a transmission mode of operation, wherein electrical current is selectively supplied to said at least one electrical current pathway, and electric current and magnetic flux interaction gives rise to a displacement force which is applied to said bobbin portion resulting in axial displacement of said bobbin portion relative to said stator portion causing said actuator member to generate an acoustic signal in said transmission liquid for transmission to said remotely located communication node; and a reception mode of operation, wherein acoustic signals developed in said transmission liquid at said remotely located communication node which are supplied to said actuator member provide a displacement force which is applied to said bobbin portion resulting in axial displacement of said bobbin portion relative to said stator portion, and wherein interaction between said selected magnetic flux and said at least one electrical current pathway generates a current in said at least one electrical current pathway which is representative of said acoustic signals in said transmission liquid.

45. An acoustic borehole communication transducer, for use in a borehole having a fluid column therein which is composed of a transmission liquid which extends from a borehole region adjacent said acoustic borehole communication transducer to a remotely located communication node, comprising:

a housing for enclosing said acoustic borehole communication transducer;

a single actuator member, carried by said housing, and in force-transferring contact with said transmission liquid, said single actuator member being characterized by being selectively operable in a transmission mode of operation and a reception mode of operation, wherein:

during said transmission mode of operation, said single actuator member is responsive to an electrical signal pattern which is representative of a coded signal and will generate an acoustic pulse pattern in said transmission liquid corresponding thereto, and direct said acoustic pulse pattern to said remotely located communication node; and during said reception mode of operation, said single actuator is responsive to an acoustic pulse pattern in said transmission liquid which is representative of a coded signal and which is developed at said remotely location communication node, and will generate an electrical signal pattern corresponding thereto which is representative of said coded signal.

46. An acoustic borehole communication transducer as claimed in claim 45, wherein said single actuator member includes:

a stator portion formed at least in-part of a magnetically permeable material;

a transducer portion formed at least in-part of a magnetically permeable material, and which is movable relative to said stator portion;

at least one magnetic field source in field-transference coupling with at least one of said stator portion and said transducer portion for providing a selected magnetic flux;

wherein at least one substantially closed-loop magnet flux pathway is defined in said actuator member which includes said stator portion and said transducer portion as flux pathway components, for accepting said selected magnetic flux from said at least one magnetic field source;

at least one electrical current pathway carried by said transducer portion which traverses said at least one substantially closed-loop magnetic flux pathway; and wherein during said transmission mode of operation electrical current is selectively supplied to said at least one electrical current pathway, and electric current and magnetic flux interaction gives rise to a displacement force which is applied to said transducer portion resulting in displacement of said transducer portion relative to said stator portion causing said actuator member to generate an acoustic signal in said transmission liquid for transmission to said remotely located communication node; and wherein during said reception mode of operation acoustic signals developed in said transmission liquid at said remotely located communication node which are supplied to said actuator member provide a displacement force which is applied to said transducer portion resulting in displacement of said transducer portion relative to said stator portion, and wherein interaction between said selected magnetic flux and said at least one electrical current pathway generates a current in said at least one electrical current pathway which is representative of said acoustic signals in said transmission liquid.

47. An acoustic borehole communication transducer as claimed in claim 45, wherein said single actuator member includes:

a stator portion formed at least in-part of a magnetically permeable material;

a bobbin portion formed at least in-part of a magnetically permeable material, and which is axially movable relative to said stator portion over a selected distance range;

at least one magnetic field source in field-transference coupling with at least one of said stator portion and said bobbin portion for providing a selected magnetic flux;

wherein at least one substantially closed-loop magnetic flux pathway is defined in said actuator member which includes said stator portion and said bobbin portion as flux pathway components, for accepting said selected magnetic flux from said at least one magnetic field source;

at least one electrical current pathway carried by said bobbin portion which traverses said at least one substantially closed-loop flux pathway; and wherein during said transmission mode of operation electrical current is selectively supplied to said at least one electrical current pathway, and electric current and magnetic flux interaction gives rise to a displacement force which is applied to said bobbin portion resulting in axial displacement of said bobbin portion relative to said stator portion causing said actuator member to generate an acoustic signal in said transmission liquid for transmission to said remotely located communication node; and wherein during said reception mode of operation acoustic signals developed in said transmission liquid at said remotely located communication node which are supplied to said actuator member provide a displacement force which is applied to said bobbin portion resulting in axial displacement of said bobbin portion relative to said stator portion, and wherein interaction between said selected magnetic flux and said at least one electrical current pathway generates a current in said at least one electrical current pathway which is representative of said acoustic signals in said transmission liquid.

48. An acoustic borehole communication transducer as claim in claim 45, wherein said single actuator member includes:

a stator portion formed at least in-part of a magnetically permeable material;

a force-transference portion formed at least in-part of a magnetically permeable material, and which is movable relative to said stator portion;

at least one magnetic field source in field-transference coupling with at least one of said stator portion and said force-transference portion for providing a selected magnetic flux;

wherein at least one substantially closed-loop magnetic flux pathway is defined in said actuator member which includes said stator portion and said force-transference portion as flux pathway components, for accepting said selected magnetic flux from said at least one magnetic field source;

at least one electrical current pathway carried by said force-transference portion which traverses said at least on substantially closed-loop magnetic flux pathway; and wherein said acoustic borehole communication transducer is operable in only a transmission mode of operation, wherein electrical current is selectively supplied to said at least one electrical current pathway, and wherein electric current and magnetic flux interaction gives rise to a displacement force which is applied to said force-transference portion resulting in displacement of said force-transference portion relative to said stator portion causing said actuator member to generate an acoustic signal in said transmission liquid for transmission to said remotely located communication node.

49. An acoustic borehole communication transducer as claimed in claim 45, wherein said single actuator member includes:

a stator portion formed at least in-part of a magnetically permeable material;

a force-transference portion formed at least in-part of a magnetically permeable material, and which is movable relative to said stator portion;

at least one magnetic field source in field-transference coupling with at least one of said stator portion and said force-transference portion for providing a selected magnetic flux;

wherein at least one substantially closed-loop magnetic flux pathway is defined in said actuator member which includes said stator portion and said force-transference portion as flux pathway components, for accepting said selected magnetic flux from said at least one magnetic field source;

at least one electrical current pathway carried by said force-transference portion which traverses said at least one substantially closed-loop magnetic flux pathway; and wherein said transducer portion is operable in only a reception mode of operation, wherein acoustic signals developed in said transmission liquid which are supplied to said actuator member provide a displacement force which is applied to said force-transference portion resulting in displacement of said force-transference portion relative to said stator portion, and wherein interaction between said selected magnetic flux and said at least one electrical current pathway generates a current in said at least one electrical current pathway which is representative of said acoustic signals in said transmission liquid.

50. An acoustic borehole communication transducer as claimed in claim 45, wherein said single actuator member includes:

means defining at least one magnetic circuit having a plurality of gaps spaced lengthwise in said housing;

a multiple number of electrical windings, each of which is in a corresponding one of said gaps for interaction with magnetic flux flowing therethrough;

a piston connected to said multiple number of windings for movement therewith in a force additive manner; and at least one side of said piston positioned to interact with a liquid in a communication channel of said borehole either to radiate acoustic waves into the same or to receive acoustic power therefrom.

51. An acoustic borehole communication transducer as claimed in claim 50, further including a chamber defining a compliant back-load for said piston, and directing means including a window in said chamber between a portion thereof communicating with said piston and a portion thereof communicating with liquid in said borehole communication channel, said window being spaced from the location at which said transducer interacts with said liquid by generally an odd number of quarter wavelengths of the nominal frequency of the central wavelength of potential communication waves.

52. A borehole acoustic communication transducer as claimed in claim 45, wherein said single actuator member includes:

a plurality of permanent magnets defining a multiple number of closed loop path magnetic circuits fully within said housing and having gaps therein, adjacent ones of said circuits sharing a common pathway for flux within which there is one of said gaps;

electrical windings in said gaps for interaction with magnetic flux flowing therethrough;

a piston connected to said windings for movement therewith in a force additive manner, at least one side of which is positioned to interact with a liquid in a communication channel of said borehole either to radiate acoustic waves into the same or to receive acoustic power therefrom, said housing including a window therein facilitating said interaction of said one side of said piston with said liquid, the cross-sectional area in said communication channel in the section of said borehole having said location at which said piston interacts therewith being appreciably different than the cross-sectional area in an adjacent section of said borehole;

a transition section in said communication channel between said borehole sections having a cross-sectional area and length selected to match the impedance of transmission of acoustic wavelengths through said communication channel at said borehole sections, said transition section being about one-quarter wavelength long relative to the nominal frequency of the central wavelength of potential communication waves at said section and the cross-sectional area of liquid within said borehole at said transition section being essentially the square root of the product of the cross-sectional areas of liquid in said adjacent borehole sections;

a multiple number of step increases in the liquid cross-sectional areas in said borehole communication channel, spaced from said transducer generally an odd number of quarter wavelengths nominally about the central wavelength of potential communication by said acoustic waves, said step increases being positioned lengthwise in said borehole in a direction from said transducer opposite that desired for said communication; and a multiple number of step decreases in the liquid cross-sectional area in said borehole, interleaved with said step increases and spaced from said transducer generally an even number of quarter wavelengths nominally about the central wavelength of potential communication by said acoustic waves.

53. A borehole acoustic communication transducer as claimed in claim 45, wherein said single actuator member includes:

a closed loop path magnetic circuit within said housing having at least two gaps spaced apart lengthwise;

at least two electrical windings, each of which is in a corresponding one of said gaps for interaction with magnetic flux flowing therethrough;

a piston connected to said windings for movement therewith in a force additive manner, at least one side of which is positioned to interact with a liquid in a communication channel of said borehole either to radiate acoustic waves into the same or to receive acoustic power therefrom, said housing including a window therein facilitating said interaction of said one side of said piston with said liquid, the cross-sectional area in said communication channel in the section of said borehole having said location at which said piston interacts therewith being appreciably different than the cross-sectional area in an adjacent section of said borehole;

a transition section in said communication channel between said borehole sections having a cross-sectional area and length selected to match the impedance of transmission of acoustic wavelengths through said communication channel at said borehole sections, said transition section being about one-quarter wavelength long relative to the nominal frequency of the central wavelength of potential communication waves at said section and the cross-sectional area of liquid within said borehole at said transition section being essentially the square root of the product of the cross-sectional areas of liquid in said adjacent borehole sections; and a step increase in the liquid cross-sectional area in said borehole communication channel, spaced from said transducer generally an odd number of quarter wavelengths nominally about the central wavelength of potential communication by said acoustic waves, said step area increase being positioned lengthwise in said borehole in a direction from said transducer opposite that desired for said communication.

54. An acoustic borehole communication transducer as claimed in claim 53, further including a chamber defining a compliant back-load for said piston, with a window in said chamber between a portion thereof communicating with said piston and a portion thereof communicating with liquid in said borehole communication channel, said window being spaced from the location at which said transducer interacts with said liquid by generally an odd number of quarter wavelengths of the nominal frequency of the central wavelength of potential communication waves at the locations of said window and the point of said interaction.

55. A borehole communication apparatus, for use in a borehole having a fluid column therein which extends from a borehole region adjacent said borehole communication apparatus to a remotely located communication node, comprising:

a housing for enclosing said borehole communication apparatus;

an actuator member, carried by said housing, and at least partially in force-transference contact with said fluid column;

said actuator member characterized by being an operative component of said borehole communication apparatus, which:

during a message transmission mode of operation, is moved relative to said housing in a pattern determined by a coded message in an electric signal form, and which operates to impress an acoustic pulse pattern upon said fluid column;

during a message reception mode of operation, is moved relative to said housing in a pattern determined by a coded message in acoustic energy form which is present in said fluid column, and which at least partially generates an electric signal corresponding to said coded message;

wherein said actuator member is at least partially disposed in a magnetic circuit defined within said housing.

56. A borehole communication apparatus according to claim 55, further comprising:

a housing for enclosing said borehole communication apparatus;

an actuator member, carried by said housing, and at least partially in force-transference contact with said fluid column;

said actuator member characterized by being an operative component of said borehole communication apparatus, which:

during a message transmission mode of operation, is moved relative to said housing in a pattern determined by a coded message in an electric signal form, and which operates to impress an acoustic pulse pattern upon said fluid column;

during a message reception mode of operation, is moved relative to said housing in a pattern determined by a coded message in acoustic energy form which is present in said fluid column, and which at least partially generates an electric signal corresponding to said coded message;

means for at least partially preferentially directing longitudinal acoustic waves of a selected frequency in a desired communication direction in said borehole.

* * * * *